US009533697B2

(12) United States Patent
Avetian et al.

(10) Patent No.: US 9,533,697 B2
(45) Date of Patent: Jan. 3, 2017

(54) DEPLOYABLE DECELERATOR

(71) Applicant: HYPERLOOP TECHNOLOGIES, INC., Los Angeles, CA (US)

(72) Inventors: Tadeh Avetian, Burbank, CA (US); Helen Durden, El Segundo, CA (US); Ryan Okerson, Pasadena, CA (US); Brogan Bambrogan, Los Angeles, CA (US); Joshua Giegel, Hawthorne, CA (US)

(73) Assignee: HYPERLOOP TECHNOLOGIES, INC., Los Angeles, CA (US)

( * ) Notice: Subject to any disclaimer, the term of this patent is extended or adjusted under 35 U.S.C. 154(b) by 0 days.

(21) Appl. No.: 15/007,718

(22) Filed: Jan. 27, 2016

(65) Prior Publication Data

US 2016/0229427 A1 Aug. 11, 2016

Related U.S. Application Data

(60) Provisional application No. 62/255,680, filed on Nov. 16, 2015, provisional application No. 62/113,511, filed on Feb. 8, 2015.

(51) Int. Cl.
*B61H 9/00* (2006.01)
*B61H 13/00* (2006.01)
(Continued)

(52) U.S. Cl.
CPC ................. *B61H 9/00* (2013.01); *B61B 13/08* (2013.01); *B61B 13/10* (2013.01); *B61C 11/06* (2013.01);
(Continued)

(58) Field of Classification Search
CPC ........... B61H 9/00; B61H 13/10; B61H 13/00; B61B 13/08; B61B 13/10; B61C 11/06; Y10S 505/908; B65G 51/20; Y10T 30/30
See application file for complete search history.

(56) References Cited

U.S. PATENT DOCUMENTS 131,322 A 9/1872 Anderson
2,296,771 A 9/1942 Crawford et al.
(Continued)

FOREIGN PATENT DOCUMENTS

EP 2371613 10/2011
WO WO03002370 A1 1/2003
(Continued)

OTHER PUBLICATIONS

U.S. Appl. No. 15/007,783, entitled "Transportation System."
(Continued)

*Primary Examiner* — Russell Frejd
(74) *Attorney, Agent, or Firm* — Greenblum & Bernstein, P.L.C.

(57) ABSTRACT

A transport vehicle for traveling in a low-pressure environment structure is provided. The transport vehicle may include a deployable decelerator provided on the transport vehicle and configured to deploy from the transport vehicle to decrease a distance between the transport vehicle and the low-pressure environment structure. When the decelerator is deployed the decelerator is configured to increase drag forces opposing a direction of motion of the transport vehicle and decelerate the transport vehicle.

23 Claims, 12 Drawing Sheets

350 320 (340) 240 330a 320 (330) C B A F C B A Direction of motion 360 310 310a 120

(51) Int. Cl.
*B61B 13/08* (2006.01)
*B61B 13/10* (2006.01)
*B61C 11/06* (2006.01)
*B65G 51/20* (2006.01)

(52) U.S. Cl.
CPC ............... *B61H 13/00* (2013.01); *B65G 51/20* (2013.01); *Y10S 505/908* (2013.01)

(56) References Cited

U.S. PATENT DOCUMENTS 2,488,287 A 11/1949 Goddard
2,511,979 A 6/1950 Goddard
2,791,633 A 9/1956 Sindzinski
2,956,823 A 10/1960 Benjamin, Jr. et al.
3,006,288 A 10/1961 Brown
3,083,528 A 4/1963 Brown
3,100,454 A 8/1963 Dennis
3,132,416 A 5/1964 Hait
3,233,559 A 2/1966 Smith et al.
3,605,629 A 9/1971 Edwards
3,610,163 A 10/1971 Edwards
3,738,281 A 6/1973 Waidelich
3,750,803 A 8/1973 Paxton
3,768,417 A 10/1973 Thornton et al.
3,776,141 A 12/1973 Gelhard et al.
3,854,411 A 12/1974 Lichtenberg
3,952,667 A * 4/1976 Kovanov ............... B65G 51/04 104/138.1
3,954,064 A * 5/1976 Minovitch ............ B60L 13/006 104/130.02
3,999,487 A * 12/1976 Valverde ................ B65G 51/08 104/138.1
4,015,540 A 4/1977 Roxberry
4,023,500 A * 5/1977 Diggs .................... B65G 51/04 104/138.1
4,075,948 A 2/1978 Minovitch
4,108,077 A 8/1978 Laing
4,148,260 A * 4/1979 Minovitch ............ B60L 13/006 104/138.1
4,166,419 A * 9/1979 Ardeleanu ............. B65G 51/06 104/138.1
4,175,414 A 11/1979 Peytavin
4,202,272 A 5/1980 Teodorescu et al.
4,400,655 A 8/1983 Curtiss et al.
4,427,740 A 1/1984 Stackhouse et al.
4,676,295 A 6/1987 Samuelson
4,718,459 A 1/1988 Adorjan
5,029,531 A * 7/1991 Crafton ................... B61B 13/10 104/138.1
5,282,424 A 2/1994 O'Neill
5,388,527 A 2/1995 Thornton et al.
5,460,098 A * 10/1995 Jackson ................... B60V 3/04 104/124
5,619,930 A 4/1997 Alimanestiano
5,899,635 A 5/1999 Kuja et al.
5,909,710 A * 6/1999 Cummins ................ B60V 3/04 104/23.2
5,950,543 A * 9/1999 Oster ...................... B61B 13/10 104/130.05
6,279,485 B1 8/2001 Schlienger
6,311,476 B1 11/2001 Frye et al.
6,373,153 B1 4/2002 Hazelton et al.
6,374,746 B1 4/2002 Fiske
6,418,857 B1 7/2002 Okano et al.
6,502,517 B1 1/2003 Groening et al.
6,514,592 B1 * 2/2003 Hubbard ............... C04B 35/573 188/251 A
6,684,794 B2 2/2004 Fiske et al.
7,835,830 B2 11/2010 Ellmann et al.
7,841,564 B2 11/2010 Ellmann et al.
8,006,625 B2 8/2011 Yang
8,214,957 B2 7/2012 Miettinen
8,250,990 B2 8/2012 Kunz
8,281,723 B2 10/2012 Loeser et al.
8,297,195 B2 10/2012 Loser et al.
8,468,949 B2 6/2013 Kwon et al.
8,500,373 B1 8/2013 Epps
8,534,197 B2 9/2013 Miller
8,734,139 B2 5/2014 Burns et al.
8,915,192 B2 12/2014 Zhou
9,085,304 B2 7/2015 Oster
9,165,461 B1 10/2015 Chu
9,221,481 B2 12/2015 Desbordes et al.
9,228,298 B2 1/2016 Oster
9,290,187 B2 3/2016 Dalrymple
9,302,577 B2 4/2016 Catalan
2001/0037747 A1 11/2001 Svensson
2004/0155031 A1 11/2002 Kazama et al.
2002/0197135 A1 12/2002 Arntzen et al.
2004/0056538 A1 3/2004 Du et al.
2004/0139723 A1 7/2004 Parkin
2004/0144096 A1 7/2004 Wollenweber
2005/0076802 A1 4/2005 Pullium
2006/0032063 A1 2/2006 Tomasello et al.
2006/0235589 A1 10/2006 Deng et al.
2007/0187556 A1 8/2007 Yoshitake
2008/0275572 A1 11/2008 Tillotson
2008/0277534 A1 11/2008 Ellmann et al.
2009/0101040 A1 4/2009 Yang
2009/0158955 A1 6/2009 Pulliam
2010/0005997 A1 1/2010 Tozoni
2010/0092243 A1 4/2010 Bauder
2010/0115947 A1 5/2010 Galbraith
2010/0143044 A1 6/2010 Kadaster et al.
2010/0183407 A1 7/2010 Kim
2011/0226764 A1 9/2011 Smith et al.
2011/0283914 A1 11/2011 Kwon et al.
2012/0089525 A1 * 4/2012 Kley ....................... B61B 13/08 705/315
2012/0153744 A1 6/2012 Criswell et al.
2012/0285575 A1 11/2012 Catha
2012/0299684 A1 11/2012 Won
2013/0276665 A1 10/2013 Dalrymple
2014/0000473 A1 * 1/2014 Miller ..................... B61C 11/06 104/138.1
2014/0354064 A1 12/2014 Tseliakhovich

FOREIGN PATENT DOCUMENTS

WO WO03003389 A1 1/2003
WO WO2007087028 A2 8/2007
WO WO2009/135389 11/2009

OTHER PUBLICATIONS

U.S. Appl. No. 15/007,882, entitled "Transportation System."
U.S. Appl. No. 15/007,829, entitled "Transportation System."
U.S. Appl. No. 15/007,452, entitled "Transportation System."
U.S. Appl. No. 15/007,883, entitled "Transportation System."
U.S. Appl. No. 15/007,993, entitled "Transportation System."
U.S. Appl. No. 15/007,712, entitled "Gate Valves and Airlocks for a Transportation System."
U.S. Appl. No. 15/008,017, entitled "Low-Pressure Environment Structures."
U.S. Appl. No. 15/007,940, entitled "Continuous Winding for Electric Motors."
U.S. Appl. No. 15/007,745, entitled "Expansion Joints, Dampers, Control Systems for a Tubular Transportation Structure Stability System."
U.S. Appl. No. 15/007,801, entitled "Axial Compressor Configuration."
U.S. Appl. No. 15/007,974, entitled "Power Supply System and Method for a Moveable Vehicle Within a Structure."
U.S. Appl. No. 15/008,024, entitled "Dynamic Linear Stator Segment Control."
U.S. Appl. No. 15/007,718, entitled "Deployable Decelerator."
Musk, E., "Hyperloop White Paper," dated Aug. 12, 2013, pp. 1-58.
Wright, I., "Engineering the Hyperloop: Testing 4 Core Elements," dated Feb. 16, 2016, 7 pages.

(56) References Cited

OTHER PUBLICATIONS

Protalinski, E., "Hyperloop's intro video claims the future is now," dated Sep. 17, 2015, 5 pages.
GNB Corporation Product Catalog, 20 pages, (Mar. 14, 2013).
Khatait, J., et al., "Design and development of orifice-type aerostatic thrust bearing," SIMTech technical reports, vol. 6, No. 1 (Jan. 2005)., 9 pages.
Barsikow, B., et al., "Noise Characteristics of the Transrapid TR08 Maglev System," US Department of Transportation, 338 pages (Jul. 2002).
Brecher, A., et al., "Electromagnetic Field Characteristics of the Transrapid TR08 Maglev System," US Department of Transportation, 224 pages (May 2002).
Chan, L., et al., "Vibration Characteristics of the Transrapid TR08 Maglev System," US Department of Transportation, 143 pages (Mar. 2002).
Todorovich et al., "High-Speed Rail—International Lessons for U.S. Policy Makers," Lincoln Institute of Land Policy, 64 pages (2011).
Peterman, D., et al., "The Development of High Speed Rail in the United States: Issues and Recent Events," Congressional Research Service, 35 pages (Dec. 20, 2013).
International Search Report and Written Opinion of International Searching Authority for related Application No. PCT/US2016/015231, dated Mar. 25, 2016.
International Search Report and Written Opinion of International Searching Authority for related Application No. PCT/US16/15228, dated Apr. 8, 2016.
International Search Report and Written Opinion of International Searching Authority for related Application No. PCT/US16/15215, dated Apr. 8, 2016.
International Search Report and Written Opinion of International Searching Authority for related Application No. PCT/US2016/015234, dated Apr. 4, 2016.
Barboza, D., "A New Port in Shanghai, 20 Miles Out to Sea," The New York Times, Dec. 12, 2005, 3 pages.
International Search Report and Written Opinion of International Searching Authority for related Application No. PCT/US2016/015221, dated Mar. 31, 2016.
International Search Report and Written Opinion of International Searching Authority for related Application No. PCT/US2016/015224, dated Apr. 11, 2016.
International Search Report and Written Opinion of International Searching Authority for related Application No. PCT/US2016/015229, dated Apr. 4, 2016.
Thornton. R., "The Future of Maglev," Magnemotion, Nov. 5, 2007, 5 pages.
International Search Report and Written Opinion of International Searching Authority for related Application No. PCT/US2016/015206, dated Apr. 1, 2016.
International Search Report and Written Opinion of International Searching Authority for related Application No. PCT/US2016/015236, dated Mar. 29, 2016.
International Search Report and Written Opinion of International Searching Authority for related Application No. PCT/US2016/015238, dated Apr. 1, 2016.
International Search Report and Written Opinion of International Searching Authority for related Application No. PCT/US2016/015239, dated Mar. 30, 2016.

* cited by examiner

DEPLOYABLE DECELERATOR

CROSS REFERENCE TO RELATED APPLICATIONS

The present application claims the benefit of U.S. Provisional Application No. 62/113,511 filed on Feb. 8, 2015, and U.S. Provisional Application No. 62/255,680 filed on Nov. 16, 2015, the disclosures of which are expressly incorporated by reference herein in their entireties.

FIELD OF THE DISCLOSURE

The present disclosure relates to the field of braking and deceleration. More particularly, the present disclosure relates to deceleration of a transport vehicle within a low-pressure environment.

BACKGROUND OF THE DISCLOSURE

A high speed, high efficiency transportation system utilizes a low-pressure environment in order to reduce drag on a vehicle traveling at high operating speeds, thus providing the dual benefit of allowing greater speed potential and lowering the energy costs associated with overcoming drag forces. The vehicle operates in a near vacuum condition within the low-pressure environment, typically between two terminal stations. Such transportation systems can utilize a variety of acceleration systems to achieve the high speed allowed, including electromagnetic levitation. Due to the elevated operation speeds, tremendous forces are required to decelerate the vehicle and allow the vehicle to slow down or come to a complete stop.

SUMMARY OF THE EMBODIMENTS OF THE DISCLOSURE

Because of these high speeds, conventional braking systems and methods are impractical. Current practices do not envision a transport vehicle, method or system that create a sustainable frictional braking system designed to handle the immense forces that would be produced by attempting to decelerate the vehicle to a slower speed or a complete stop because current transportation vehicles and systems do not operate at the speed that a partially-evacuated, low-pressure environment allows. Thus, there is a need to design a transport vehicle, a deceleration method and a deceleration system that allow transport vehicles operating at elevated speeds within a low-pressure environment structure (e.g., a transport tube) to decelerate safely and in a stable manner.

According to non-limiting embodiments of the present application, a transport vehicle for traveling in a low-pressure environment structure is provided. The transport vehicle may include a deployable decelerator provided on the transport vehicle and configured to deploy from the transport vehicle to decrease a distance between the transport vehicle and the low-pressure environment structure. When the decelerator is deployed the decelerator is configured to increase drag forces opposing a direction of motion of the transport vehicle and decelerate the transport vehicle.

In embodiments, the deployable decelerator may include an airbag that is configured to deploy from a frontal area of the transport vehicle outward in a direction —toward the low-pressure environment structure.

In embodiments, the deployable decelerator may include at least one plate that is configured to deploy from a frontal area of the transport vehicle outward in a direction toward the low-pressure environment structure.

In embodiments, the deployable decelerator may include an airbag and at least one plate that are configured to both deploy from the transport vehicle outward in a direction toward the low-pressure environment structure.

In embodiments, the deployable decelerator may include a brace configured to support the outward deployment of the airbag as the drag forces acting on the transport vehicle increase during deceleration.

In embodiments, the deployable decelerator may be configured to deploy such that a frontal area of the transport vehicle substantially fills an entire inner cross sectional area of the low-pressure environment structure.

In embodiments, the deployable decelerator may include a deployable braking pad that is configured to deploy along an outer peripheral surface of the transport vehicle and configured to couple with a fixed braking pad provided on and extending along the low-pressure environment structure. When the deployable braking pad is actuated, the deployable braking pad may be configured to press against the fixed braking pad on the low-pressure environment structure to generate frictional forces to decelerate the transport vehicle.

In embodiments, the deployable braking pad may include a plurality of braking pads deployable at spaced intervals along the outer peripheral surface of the transport vehicle in a direction toward the low-pressure environment structure.

In embodiments, the deployable braking pad may include a carbon reinforced carbon material contact surface that contacts a corresponding contact surface of the fixed braking pad on the low-pressure environment structure.

According to non-limiting embodiments of the present application, a method of decelerating a transport vehicle in a low-pressure environment structure is provided. The method may include monitoring at least one operation parameter collected by at least one sensor, analyzing, via a controller communicating with the at least one sensor, the at least one collected operation parameter, detecting, via the controller, a triggering event based on the at least one collected operation parameter, transmitting, via a signal from the controller, instructions to a transport vehicle deceleration system to decelerate the transport vehicle, and deploying a decelerator from the transport vehicle deceleration system to decelerate the transport vehicle in the low-pressure environment structure when the triggering event is detected.

In embodiments, the method may include deploying the decelerator such that a distance between the transport vehicle and the low-pressure environment structure is decreased, and deploying the decelerator such that a frontal area of the transport vehicle substantially fills an entire inner cross sectional area of the low-pressure environment structure.

In embodiments, the method may include deploying an airbag from the transport vehicle outward in a direction toward the low-pressure environment structure.

In embodiments, the method may include deploying at least one plate that deploys from the transport vehicle outward in a direction toward the low-pressure environment structure.

In embodiments, the method may include deploying an airbag and at least one plate from the transport vehicle outward in a direction toward the low-pressure environment structure.

In embodiments, the method may include deploying a braking pad along an outer peripheral surface of the transport vehicle and contacting a fixed braking pad provided on and extending along the low-pressure environment structure such that the braking pad presses against the fixed braking pad on the low-pressure environment structure to generate frictional forces to decelerate the transport vehicle.

In embodiments, the method may include deploying a plurality of braking pads that deploy at spaced intervals along the outer peripheral surface of the transport vehicle in a direction toward the low-pressure environment structure.

In embodiments, the method may include opening a closable ambient-air port provided on the low-pressure environment structure to draw in ambient air into the low-pressure environment structure to increase drag forces acting on the transport vehicle and decelerate the transport vehicle.

According to non-limiting embodiments of the present application, a transport vehicle deceleration system for decelerating a transport vehicle in a low-pressure environment structure is provided. The transport vehicle deceleration system may include a deployable decelerator configured to deploy from the transport vehicle to decrease a distance between the transport vehicle and the low-pressure environment structure, a closable ambient-air port provided on a low-pressure environment structure and configured to draw ambient air into the low-pressure environment structure, and when at least one of the deployable decelerator and the ambient-air port is deployed drag forces acting on the transport vehicle are increased to decelerate the transport vehicle.

In embodiments, the system may include at least one of an airbag and at least one plate deployable from the transport vehicle outward in a direction toward the low-pressure environment structure.

In embodiments, the system may include a deployable braking pad that is deployable along an outer peripheral surface of the transport vehicle and configured to couple with a fixed braking pad provided on and extending along the low-pressure environment structure such that when the deployable braking pad is actuated, the deployable braking pad is configured to press against the fixed braking pad on the low-pressure environment structure to generate frictional forces to decelerate the transport vehicle.

Other aspects and advantages of the present disclosure will become apparent from the following description taken in conjunction with the accompanying drawings, illustrated by way of example, and should be considered within the spirit of the invention.

BRIEF DESCRIPTION OF THE DRAWINGS

The novel features which are characteristic of the apparatus and systems, both as to structure and method of operation thereof, together with further aims and advantages thereof, will be understood from the following description, considered in connection with the accompanying drawings, in which embodiments of the system are illustrated by way of example. It is to be expressly understood, however, that the drawings are for the purpose of illustration and description only, and they are not intended as a definition of the limits of the system. For a more complete understanding of the disclosure, as well as other aims and further features thereof, reference may be had to the following detailed description of the disclosure in conjunction with the following exemplary and non-limiting drawings wherein.

DETAILED DESCRIPTION

In view of the foregoing, the present disclosure, through one or more of its various aspects, embodiments and/or specific features or sub-components, is thus intended to bring out one or more of the advantages as specifically noted below.

Methods described herein are illustrative examples, and as such are not intended to require or imply that any particular process of any embodiment be performed in the order presented. Words such as "thereafter," "then," "next," etc. are not intended to limit the order of the processes, and these words are instead used to guide the reader through the description of the methods. Further, any reference to claim elements in the singular, for example, using the articles "a," "an" or "the", is not to be construed as limiting the element to the singular.

Figure 1:
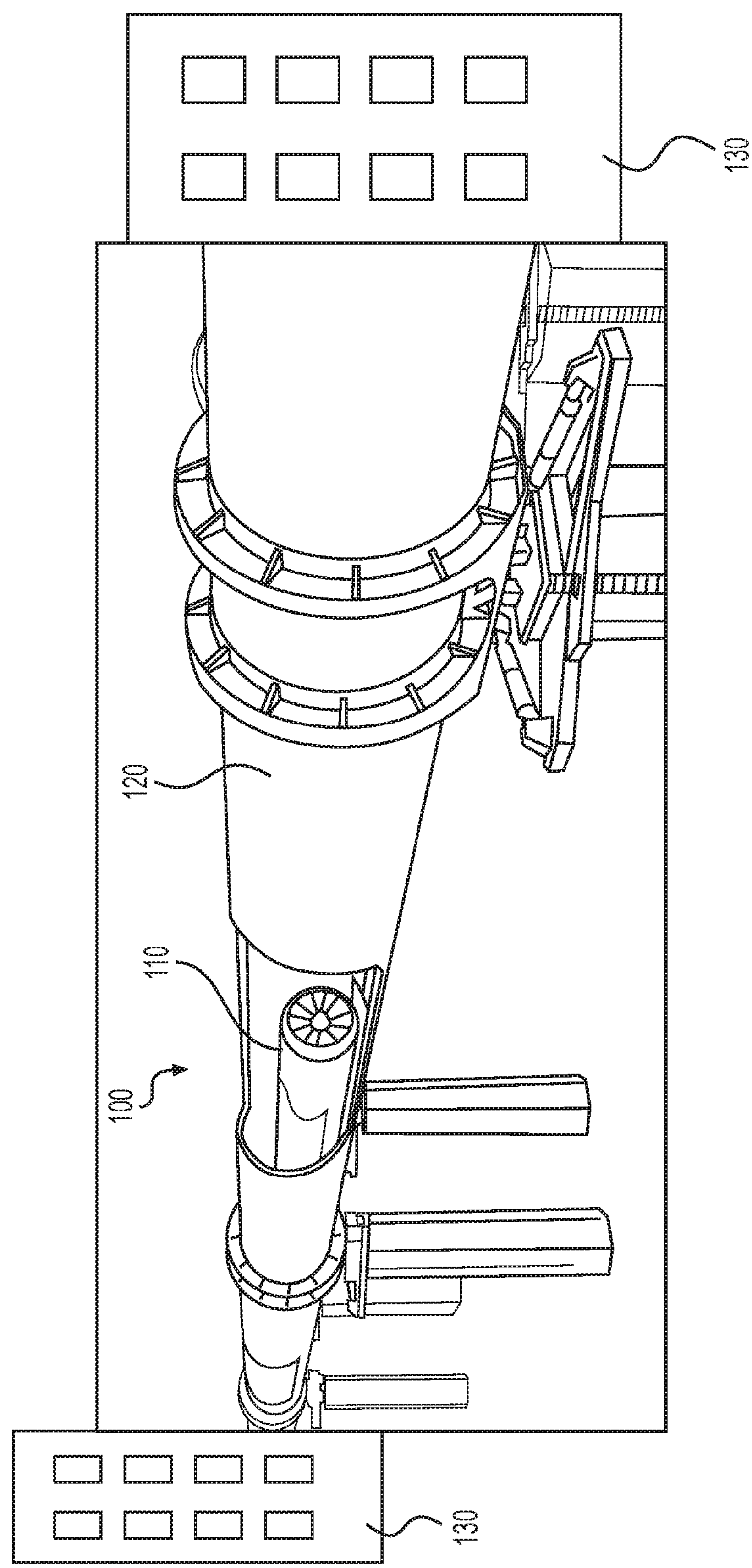
FIG. 1 shows a perspective view of an exemplary embodiment of a transportation system, according to aspects of the present disclosure.

FIG. 1 illustrates a perspective view of a transportation system 100 according to a non-limiting embodiment of the present application. The transportation system 100 includes one or more transport vehicles 110 traveling through a low-pressure environment transport tube 120 (an example of the low-pressure environment structure) between two or more terminal stations 130. In accordance with aspects of the disclosure, it is noted that a low-pressure environment includes any pressure that is below 1 atmosphere (or approximately 1 bar) at sea level. It is also noted that additional aspects, embodiments and details of the transportation system 100 are disclosed in commonly assigned U.S. application Ser. No. 15/007,783, entitled, "Transportation System," filed on even date herewith, the entire contents of which are hereby expressly incorporated by reference herein. It is further noted that while the low-pressure environment structure is described herein as a low-pressure environment transport tube, such description of the same is solely for illustrative purposes and thus the low-pressure environment structure 120 should not be considered so limited. Additional aspects, embodiments and details of the low-pressure environment structure are disclosed in commonly assigned U.S. application Ser. No. 15/008,017, entitled "Low-Pressure Environment Structures," filed on even date herewith, the entire contents of which are hereby expressly incorporated by reference herein.

During a transport operation of the transport vehicle 110, in which passengers and/or freight are moved between two or more terminal stations 130 within the low-pressure environment transport tube 120, there are times (e.g., in non-emergency situations or emergency situations) when the transport vehicle 110 must be decelerated either to a slower speed or to a complete stop. To safely and stably decelerate a given transport vehicle 110, the transportation system 100 may be provided with a transport vehicle deceleration system.

Figure 2:
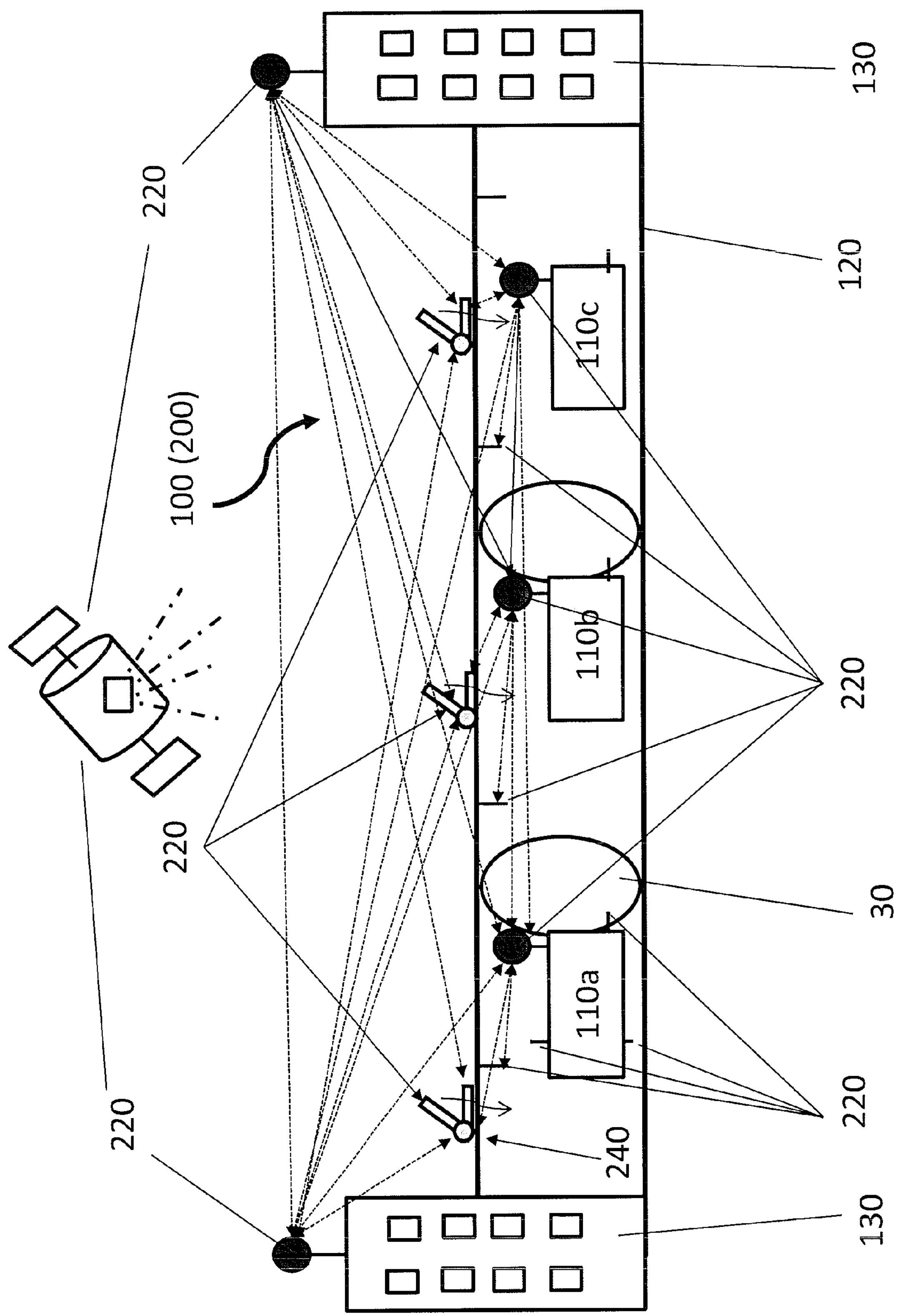
FIG. 2 shows a schematic of an exemplary, non-limiting embodiment of a transport vehicle deceleration system, according to aspects of the present disclosure.

FIG. 2 illustrates a schematic of a transport vehicle deceleration system 200 according to a non-limiting embodiment of the present application. The transport vehicle deceleration system 200 is designed to decelerate one or more transport vehicles 110 within the low-pressure environment transport tube 120. The transport vehicle deceleration system 200 enables the transport vehicles 110, sections of the low-pressure environment transport tube 120 (including the track over which the transport vehicles travel, not labeled), and the terminal stations 130 to communicate with each other so as to, for example, control the one or more transport vehicles 110 traveling within the low-pressure environment transport tube 120 and/or control operating conditions of the low-pressure environment transport tube 120 (or track). In this regard, the transport vehicle deceleration system 200 may be equipped with a plurality of sensors, monitors, processors and communications devices (collectively referenced as 220 in FIG. 2) to collect and analyze a plurality of operation parameters to determine whether one or more transport vehicles 110 should be decelerated and to initiate/actuate deceleration of the one or more transport vehicles 110 when such action is required.

In embodiments, the sensors, monitors, processors and communications devices 220 may include and relate to, but are not limited to, speed detection systems, temperature detection systems, air quality and smoke detecting systems, ventilation systems, braking systems, video monitoring systems, collision avoidance systems, global positioning systems, satellite systems, radio communication systems, Wi-Fi™ enabled communication systems, cellular communications systems, tube leakage detection systems, tube break detection systems, cabin environment detection systems, glass break detection systems, vibration detection systems, compressor and motor operation detection systems, lighting systems, and propulsion and magnetic levitation detection systems. Those having ordinary skill in the art would appreciate that other sensors, monitors, processors and communication devices may also be used to monitor, collect and analyze a plurality of operation parameters to determine whether one or more transport vehicles 110 should be decelerated and to initiate/actuate deceleration of the one or more transport vehicles 110 when such action is required. For example, those having ordinary skill in the art would readily appreciate that any conventionally known sensors, monitors, processors and communication devices utilized in monitoring and controlling mass transit systems and fleets of commercial and industrial vehicles for purposes of enhancing safety to the public, transportation infrastructure and capital equipment (e.g., existing commuter rail and fleets of vehicles such as buses, trucks, cars and planes) could be implemented throughout the transportation system 100 and/or the transport vehicle deceleration system 200.

It is contemplated that each of the implemented sensors, monitors, processors and communication devices may connect with each of the terminal stations, public safety authorities, each transport vehicle in the route and individual or multiple sections of the low-pressure environment transport tube 120 for purposes of being collected, stored and analyzed, alone, or with other information and data collected in or input to the transportation system 100 and/or the transport vehicle deceleration system 200. It is further contemplated that each of the terminal stations 130, public safety authorities, each transport vehicle 110 and individual or multiple sections of the low-pressure environment transport tube 120 are further configured to alert and initiate an actuation of the transport vehicle deceleration system 200 to decelerate the transport vehicle 110 in a safe and stable manner. It is additionally noted that further aspects, embodiments and details of the way in which the sensors, monitors, processors and communication devices 220 of the transport vehicle deceleration system 200 may be implemented in the transportation system 100 are disclosed, e.g., in FIG. 40 and the related disclosure in commonly assigned U.S. application Ser. No. 15/007,783, entitled, "Transportation System," filed on even date herewith, the entire contents of which are hereby expressly incorporated by reference herein.

For example, as illustrated in FIG. 2, spacing between transport vehicles 110*a*, 110*b*, 110*c* traveling along the same track within the low-pressure environment transport tube 120 may be maintained using the plurality of sensors, monitors, processors and various wireless communication systems 220 over a wireless communications network so that each transport vehicle 110*a*, 110*b*, 110*c* in the low-pressure environment transport tube 120 is aware of the relative location of each of the other transport vehicles 110*a*, 110*b*, 110*c*. For example, if transport vehicle 110*c* traveling downstream in the low-pressure environment transport tube 120 has slowed (e.g., due to a malfunction), then the other transport vehicles 110*a*, 110*b* upstream of the slowed transport vehicle 110*c* may recognize the situation, and the transport vehicle deceleration system 200 may decelerate the upstream transport vehicles 110*a*, 110*b* to a slower speed or to a complete stop.

As a further example of the capabilities of the transport vehicle deceleration system 200, in the event of an earthquake, sections of the low-pressure environment transport tube 120 that detect seismic activity (e.g., sections that are closer in proximity to the epicenter of the seismic activity) may communicate with other sections of the low-pressure environment transport tube (or one or more of the transport vehicles 110*a*, 110*b*, 110*c* in the low-pressure environment transport tube 120) further from the epicenter to adjust operating conditions (e.g., decelerate the transport vehicle 110 to a complete stop or draw in ambient air from outside of the low-pressure environment transport tube 120) to account for the seismic activity and minimize the negative effect on (and enhance the safety of) passengers and/or freight traveling through the low-pressure environment transport tube 120.

In embodiments, should there be a loss of communication between the transport vehicles 110 themselves, between the transport vehicles 110 and the low-pressure environment transport tube 120 (or the track), or between the transport vehicles 110 and the terminal stations 130, the transportation system 100 (or portions thereof) may shut down, and for example, the transport vehicle deceleration system 200 may actuate one or more ambient-air ports 240 (an example of a deployable decelerator), which are provided on the low-pressure environment transport tube 120 and configured to draw ambient air into the low-pressure environment transport tube 120 to assist in decelerating the one or more transport vehicles 110. That is, by removing or reducing the low-pressure environment in the transport tube 120 (e.g., bringing the pressure to atmospheric pressure), the one or more transport vehicles 110 will encounter greater air resistance, which will cause the one or more transport vehicles 110 to slow down more quickly than if the low-pressure environment had been maintained.

It is contemplated that the ambient-air port 240 may be deployed in a variety of manners. For example, the ambient-air port 240 may be rotated or slid (via conventionally known slide and rotation mechanisms, e.g., a slide bearing assembly or a hinge assembly) from a closed position, in which the ambient-air port 240 seals the low-pressure environment transport tube 120 from an outside environment, to an open position, in which the ambient-air port 240 is moved such that the low-pressure environment of the transport tube 120 is filled with ambient air from the outside environment. Those having ordinary skill in the art would appreciate that the ambient-air port 240 may be actuated by conventionally known electro-mechanical/fluid systems, e.g., a pneumatic (e.g., hydraulic) piston system that raises and lowers or slides the ambient-air port 240 relative to the low-pressure environment transport tube 120. It is further contemplated that the ambient-air port 240 may be provided at any location on the low-pressure environment transport tube 120 (i.e., upper sides, lower sides, lateral sides) so long as the ambient-air port 240 is positioned to draw ambient air into the low-pressure environment transport tube 120.

In embodiments, the one or more transport vehicles 110 may each be equipped with onboard emergency power systems sufficient to provide auxiliary propulsion (e.g., to propel the transport vehicles 110 to the next station or to an emergency egress) in the event of an emergency (e.g., in the event of an obstruction in the low-pressure environment transport tube 120 or loss of the low-pressure environment). It is contemplated that the ambient-air port 240 may also serve as an emergency egress to allow stranded passengers to remove themselves from the safety threat and exit the low-pressure environment transport tube 120.

In each of the above-noted situations, the transport vehicle deceleration system 200 may also effect actuation of deployable decelerators and/or deployable braking pads provided on the transport vehicle 110 to decelerate the same within the low-pressure environment transport tube 120. The transport vehicle deceleration system 200 is configured to enable the deployable decelerators and/or deployable braking pads to be deployed (either singly or in combination depending on how the transport vehicle 110 is equipped or configured to respond to an emergency or non-emergency triggering event) to decelerate the transport vehicle 110 in a safe and stable manner.

Figure 3A:
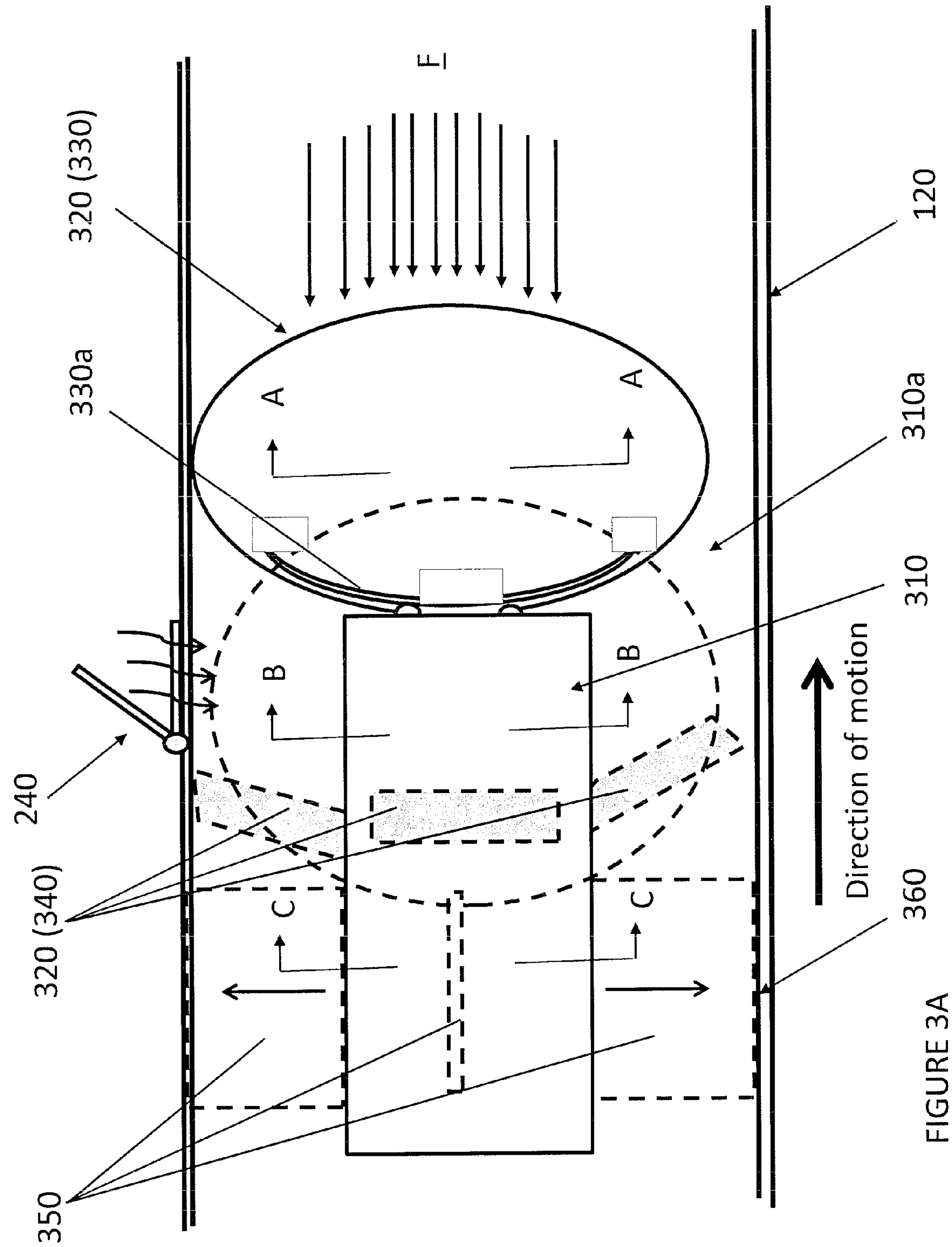
FIG. 3A shows a schematic of an exemplary, non-limiting embodiment of a transport vehicle in a low-pressure environment structure, according to a first aspect of the present disclosure.
Figure 3B:
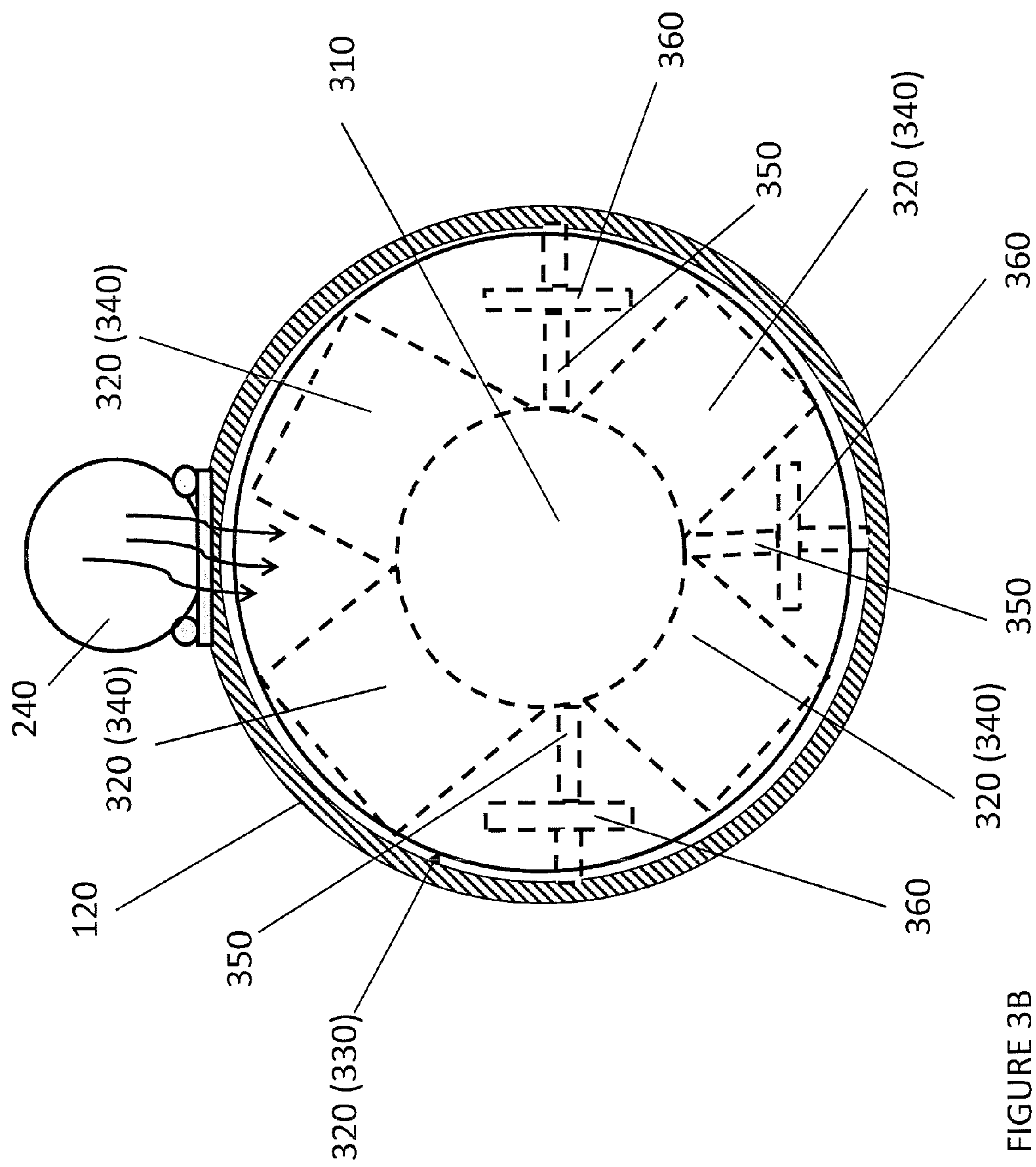
FIG. 3B shows a cross-sectional view of the transport vehicle of FIG. 3A along line A-A.

FIG. 3A illustrates a schematic of a transport vehicle 310 configured for implementation in both the transportation system 100 and the transport vehicle deceleration system 200 according to a non-limiting embodiment of the present application. As shown in FIGS. 3A and 3B, the transport vehicle 310 includes a deployable decelerator 320. The deployable decelerator 320 is configured to deploy from the transport vehicle 310 in such a manner so as to decrease a distance between the transport vehicle 310 and the low-pressure environment transport tube 120. In order to decrease the distance between the transport vehicle 310 and the low-pressure environment transport tube 120 the deployable decelerator 320 is configured to deploy such that it movably extends or projects from an inner or outer surface of the transport vehicle 310 toward an inner surface of the low-pressure environment transport tube 120. The deployable decelerator 320 may movably extend or project from the transport vehicle 310 in any upward, downward or lateral direction of the transport vehicle 310. Deployment of the deployable decelerator 320 in such a manner has the effect of increasing drag forces F acting on the transport vehicle 110 in a direction of motion of the transport vehicle 310, and thus allows the transport vehicle 310 to decelerate in a rapid, yet safe and stable manner (e.g., to decelerate for the purpose of preventing a collision with a malfunctioning transport vehicle located downstream along the route in the low-pressure environment transport tube 120).

As shown in FIG. 3A, the deployable decelerator 320 is provided to deploy from a frontal area 310*a* of the transport vehicle 310 thereby increasing a size of the frontal area 310*a* of the transport vehicle 310 to increase the drag forces F acting on the transport vehicle 310 during a deceleration. Moreover, as is also shown in FIGS. 3A and 3B, the deployable decelerator 320 is configured to deploy such that the frontal area 310*a* of the transport vehicle 310 substantially fills an entire inner cross sectional area of the low-pressure environment transport tube 120 thereby decelerating the transport vehicle 310 either to a slower speed or to a complete stop more efficiently. While the deployable decelerator 320 may be configured to substantially fill the entire cross sectional area of the low-pressure environment transport tube 120, the deployable decelerator 320 is further configured to prevent contact with the low-pressure environment transport tube 120 so as to avoid damage to the decelerator and the tube. In embodiments, the deployable decelerator 320 is configured to deploy in such a manner that a center of area of the deployed decelerator is within an acceptable distance range from a center of gravity of the transport vehicle 310 thereby preventing the decelerating forces acting on the transport vehicle 310 from inducing unstable vehicle motion.

In addition, while the deployable decelerator 320 is depicted as being deployed from the frontal area 310*a* of the transport vehicle 310, those having ordinary skill in the art would appreciate that the deployable decelerator 320 may be deployed from any outer peripheral surface of the transport vehicle 310 toward the inner surface of the low-pressure environment transport tube 120 so long as the configuration increases the drag forces F opposing the direction of motion of the transport vehicle 310 and decelerates the transport vehicle 310 in a safe and stable manner.

Figure 4A:
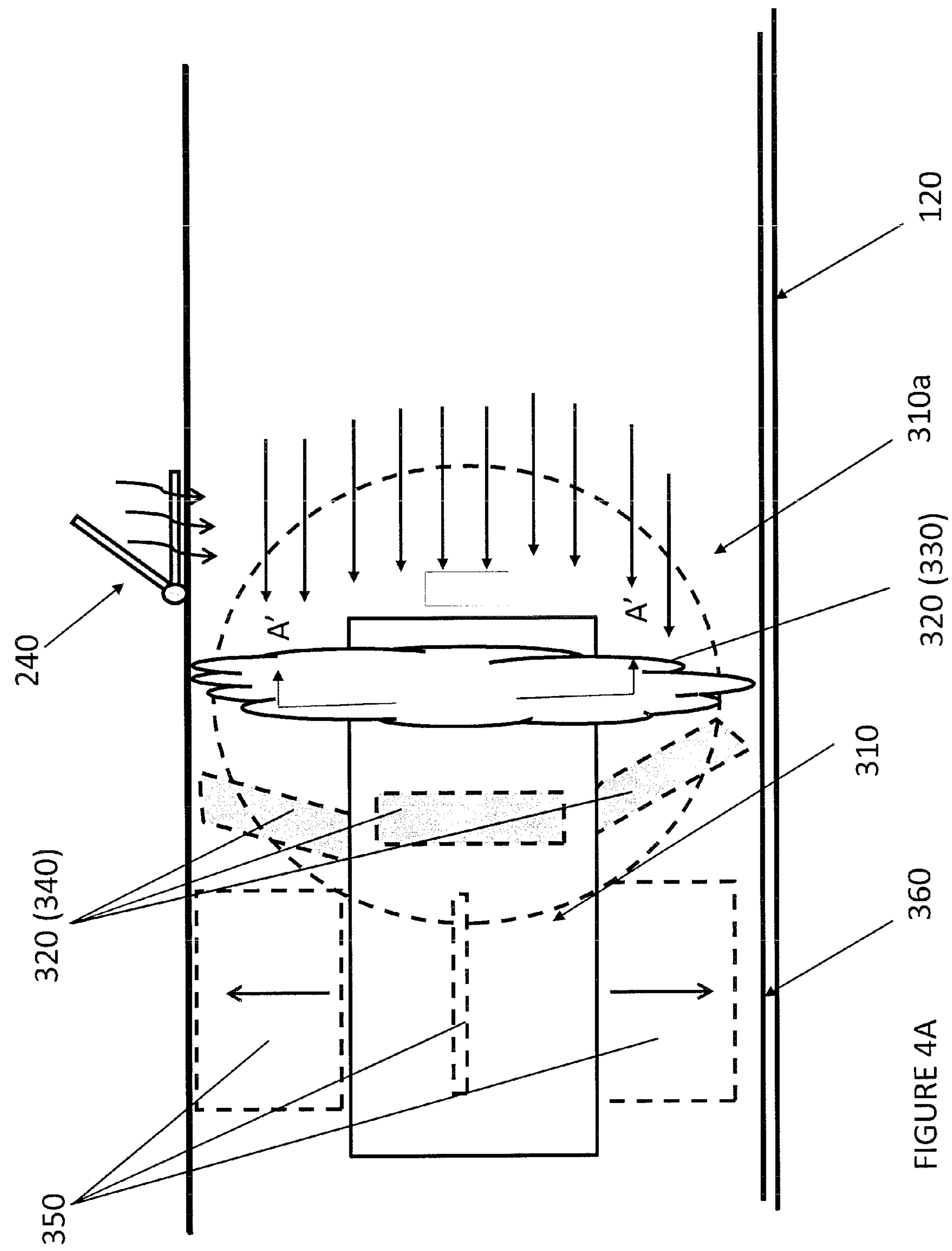
FIG. 4A shows a schematic of an alternative exemplary embodiment of a transport vehicle in a low-pressure environment structure, according to aspects of the present disclosure.
Figure 4B:
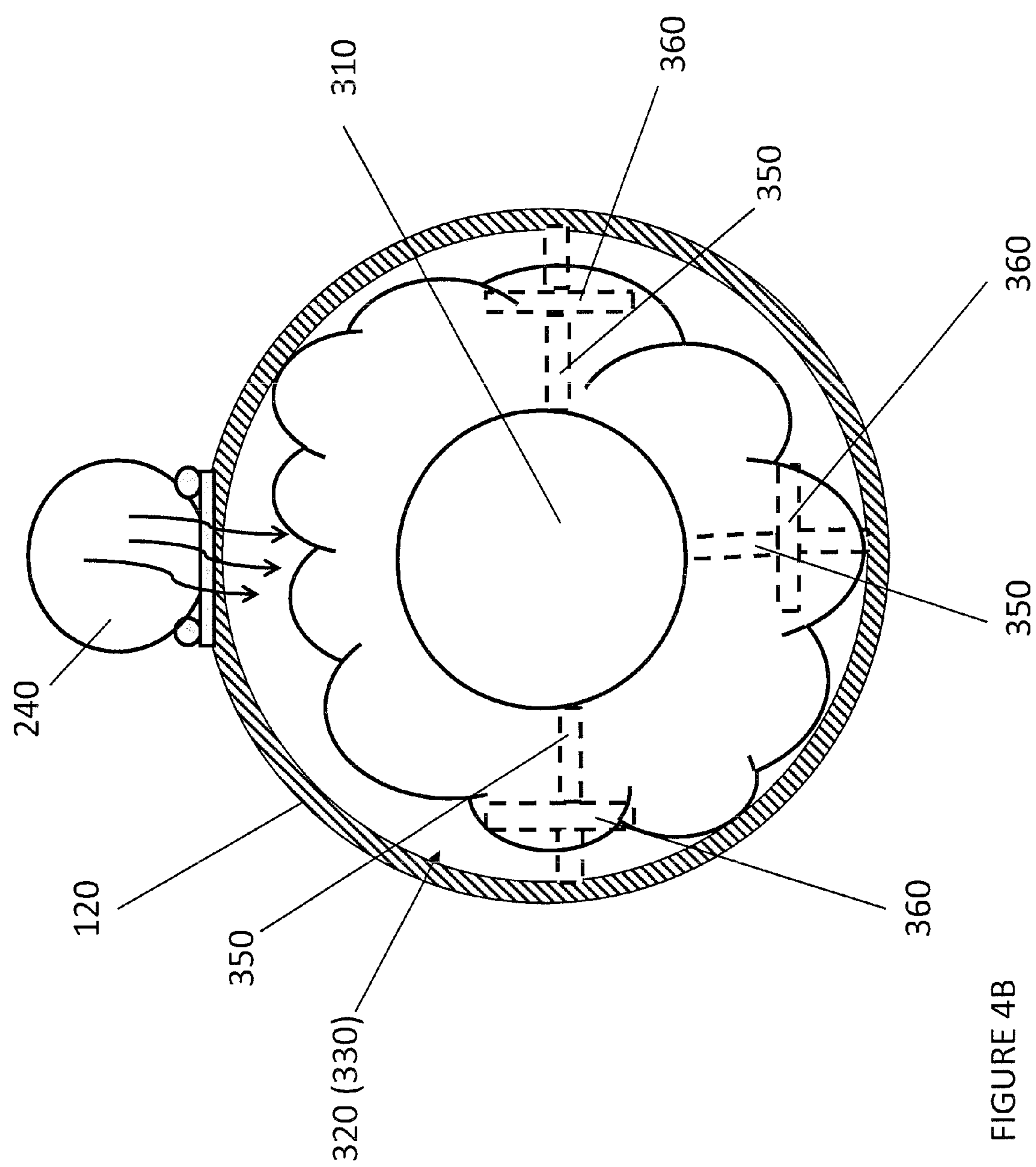
FIG. 4B shows a cross-sectional view of the transport vehicle of FIG. 4A along line A'-A'.

For example, instead of being deployed from a front-most side of the transport vehicle 310, as shown in FIG. 3A, the deployable decelerator 320 may be deployed along an outer peripheral surface of the frontal area 310*a* behind the front-most side of the transport vehicle 310, as shown in FIGS. 4A and 4B. It is contemplated that the deployable decelerator 320 may be deployed from any location along the transport vehicle 310 toward the inner surface of the low-pressure environment transport tube 120, including a rear-most side of the same, again, so long as the configuration increases the drag forces F opposing the direction of motion of the transport vehicle 310 and decelerates the transport vehicle 310 in a safe and stable manner. It is also contemplated that when the deployable decelerator 320 is deployed, the transport vehicle 310 is designed to prevent the propulsion system from interfering with and resisting the intended deceleration of the same. For example, when a deceleration is either anticipated or detected the propulsion system may be configured to shut-off, temporarily disable or switch to a neutral power-type mode or reverse power-type mode (in which the direction of propulsion is reversed against the direction of motion) to further assist in deceleration of the transport vehicle 310.

In embodiments, and as shown in FIGS. 3A, 3B, 4A and 4B, the deployable decelerator 320 includes an airbag 330 that is configured to deploy from the transport vehicle 310 outward toward an inner surface of the low-pressure environment transport tube 120. As shown, the airbag 330 deploys from the frontal area 310*a* of the transport vehicle 310 toward the inner surface of the low-pressure environment transport tube 120 in all cross sectional directions of the low-pressure environment transport tube 120. Those having ordinary skill in the art would appreciate that the airbag 330 may either be deployed from a storage area below an outer surface of the transport vehicle 310 or deployed from a housing provided at the outer surface of the transport vehicle 310. While the airbag 330 is shown as a single airbag, it is contemplated that a plurality of airbags may be deployed from the transport vehicle 310 so long as the deployment decreases the distance between the transport vehicle 110 and the low-pressure environment transport tube 120 and increases the outer peripheral area of the transport vehicle 310.

In embodiments, the airbag 330 is designed to inflate rapidly during a triggering event so as to decelerate or stop the transport vehicle 310 in a safe and stable manner to avoid a safety threat to passengers, cargo, the transport vehicle 310, other transport vehicles in the low-pressure environment transport tube 120, the low-pressure environment transport tube 120 itself, and maintenance crews working on the low-pressure environment transport tube 120, the track or other transport vehicles. For example, when it is determined that another transport vehicle in the low-pressure environment transport tube 120 is disabled and located at an unsafe distance from the transport vehicle 310, the airbag 330 is designed to deploy to decelerate the transport vehicle 310 to prevent a collision with the disabled vehicle. It is contemplated that the airbag inflation system may inflate similar to conventional inflation systems that produces nitrogen gas.

The shape of the airbag 330 and an angle of deployment relative to the direction of motion is not particularly limited so long as the distance between the low-pressure environment transport tube 120 and the transport vehicle 310 is decreased and stability and overall balance/orientation of the transport vehicle 310 relative to the low-pressure environment transport tube 120 is maintained. The airbag 330 is also designed to address the elevated operation speeds and the weight of the transport vehicle 310 in the low-pressure environment transport tube 120, as well as the elevated drag forces F acting on the airbag 330 during deceleration. Design considerations may include deployment speed, inflation force and material selection. Moreover, it is contemplated that deployment of the airbag 330 is controlled such that any forces experienced by human passengers and/or cargo during deployment are within a safety tolerance range that would prevent serious injury to passengers and/or damage to cargo. It is further contemplated that as the transport vehicle 310 continues to decelerate the airbag 330 may proportionally deflate as well, for example, through small gas outlets or holes, provided on the airbag 330. The used airbag 330 may also be retractable for repeated use or alternatively may be removed and replaced with a replacement airbag.

In embodiments and as shown in FIG. 3A, the airbag 330 includes a brace 330*a* configured to support the outward deployment of the airbag 330 as the drag forces F acting on the transport vehicle 310 increase during deceleration. Referring to FIG. 3A, the brace 330*a* may deploy with the airbag and extend outward from within the airbag 330 via conventionally known slide and rotation mechanisms (e.g., slide bearing assembly and hinge assembly). However, those having ordinary skill in the art would appreciate that the brace 330*a* may be attached to an inner/outer surface of the airbag 330 (e.g., via sewing, adhesives, laminate construction of the airbag) and serve as an integral reinforcing member of the airbag 330.

Alternatively, it is contemplated that the brace 330*a* may deploy from an outside of the airbag 330 to support and expand with outer side contours of the airbag 330 during inflation and to support the airbag 330 from a rear side throughout deceleration of the transport vehicle 310, whether or not the brace 330*a* is in constant contact with the deploying/deployed airbag 330. It is further contemplated that the brace 330*a* may slide, rotate, or slide and rotate into position within the air bag or on the outer peripheral surface of the transport vehicle 310 via the appropriate slide and rotation mechanisms. It is noted that the depiction of the brace 330*a* is omitted in FIG. 3B (the cross-sectional view of FIG. 3A), but only for purposes of clarity and to more clearly illustrate other aspects of the transport vehicle 310 described herein.

Figure 5A:
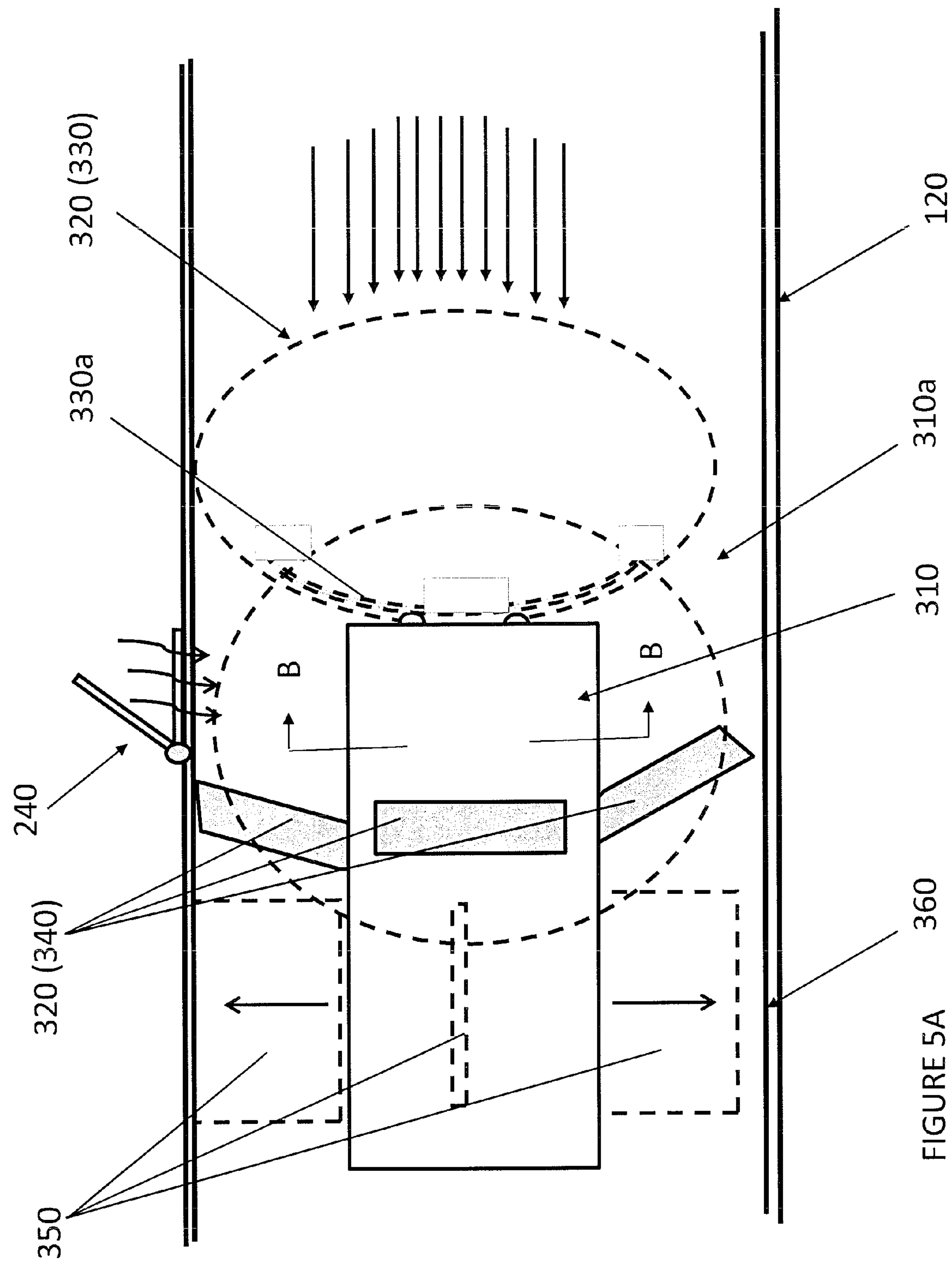
FIG. 5A shows the transport vehicle of FIG. 3A, according to a second aspect of the present disclosure.
Figure 5B:
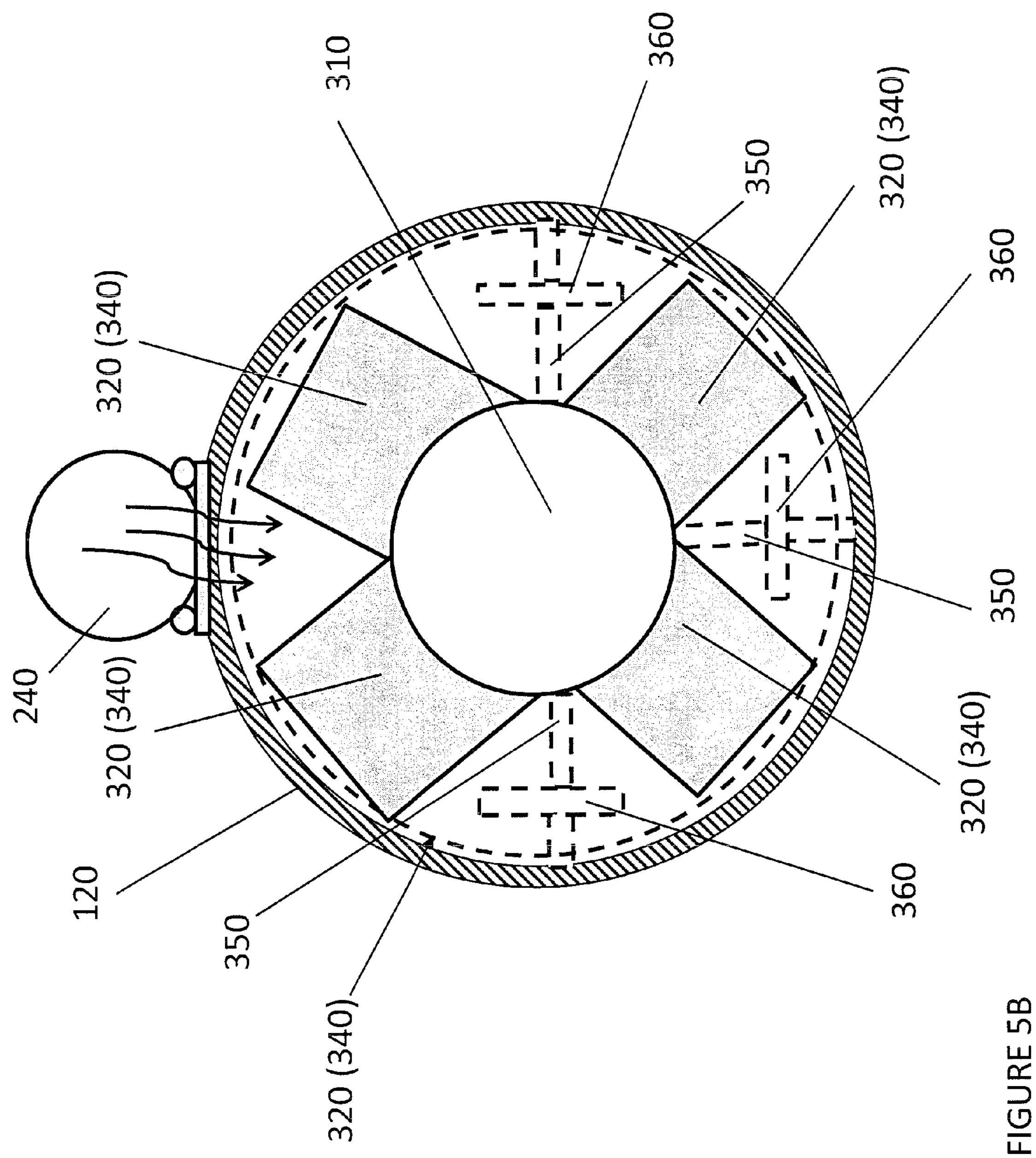
FIG. 5B shows a cross-sectional view of the transport vehicle of FIG. 5A along line B-B.

In embodiments, and as shown in FIGS. 5A and 5B, the deployable decelerator 320 includes at least one plate 340 that is configured to deploy from the transport vehicle 310 outwardly in a direction toward (e.g., a radial direction of) the low-pressure environment transport tube 120 to decrease the distance between the transport vehicle 310 and the low-pressure environment transport tube 120. Referring to FIG. 5A, the at least one plate 340 is configured to deploy from the frontal area 310*a* of the transport vehicle 310.

It is contemplated that the at least one plate 340 may be deployed in a variety of manners. For example, the at least one plate 340 may be rotated from a closed position, in which the at least one plate 340 is flush or level with the outer peripheral surface of the transport vehicle 310, to an open position, in which the at least one plate 340 is angled relative to the outer peripheral surface of the transport vehicle 310. In this regard, the at least one plate 340 may be rotated upward from the closed position to the open position such that the at least one plate 340 is generally perpendicular to the direction of motion. Those having ordinary skill in the art would appreciate that the at least one plate 340 may also be deployed to the open position such that the at least one plate 340 is positioned at an acute angle or an obtuse angle relative to the direction of motion. It is further contemplated that actuation of the at least one plate 340 is similar to that described above with respect to the ambient-air port 240 and may be based, e.g., on the actuation of a pneumatic (e.g., hydraulic) piston system that raises and lowers or slides the at least one plate 340 relative to the outer peripheral surface of the transport vehicle 310.

It is still further contemplated that the at least one plate 340 may be one or more winged portions of the transport vehicle 310 that, in the closed position, serves an aerodynamic function under normal operation conditions, and that in the open position, serve to assist in the deceleration of the transport vehicle 310. For example, the winged portion of the transport vehicle 310 may be oriented to minimize its surface area in the direction of motion under normal operating speeds and may be rotated (e.g., via an internal motor)

to maximize its surface area in the direction of motion during deceleration. It is also contemplated that the winged portion may be fixed relative to the outer peripheral surface of the transport vehicle, but may have rotatable or slidable components (similar to the at least one plate 340 described herein) that are deployable toward the inner surface of the low-pressure environment transport tube 120 to maximize its surface area in the direction of motion during deceleration.

In embodiments, a plurality of plates 340 are provided adjacent one another at spaced intervals surrounding the transport vehicle 310. Each plate 340 may be flat, have a slight curvature, or an aerodynamic profile depending on the contour of the outer peripheral surface of the transport vehicle 310, the manner in which the plate 340 is slid out from below the outer peripheral surface, or the function of the plate during normal operating conditions. The plates 340 may also be rigid or have flexibility to accommodate the drag forces F acting on them during deployment or while they are fully extended during deceleration. In embodiments, and as shown in FIGS. 5A and 5B, the at least one plate 340 is configured to deploy such that the frontal area 310*a* of the transport vehicle 310 is increased and substantially fills an entire inner cross sectional area of the low-pressure environment transport tube 120.

Those having ordinary skill in the art would readily appreciate that the at least one plate 340 may also be slidably deployed from a closed position, in which the at least one plate 340 is flush or level with the outer peripheral surface of the transport vehicle 310, to an open position, in which the at least one plate 340 is slid upward from the outer peripheral surface so as to project from the outer peripheral surface of the transport vehicle 310. Similar to the rotatable plates described above, the sliding direction of the at least one plate 34 may be angled relative to the outer peripheral surface of the transport vehicle 310. For example, the at least one plate 340 may be slid upward from the closed position to the open position such that the at least one plate 340 is generally perpendicular to, or forms an acute or obtuse angle relative to, the direction of motion. It is further contemplated that actuation of the slidable plate 340 is similar to that described above with respect to the rotatable plate 340.

The shape of the at least one plate 340 and an angle of deployment relative to the direction of motion is not particularly limited so long as the distance between the low-pressure environment transport tube 120 and the transport vehicle 310 is decreased and stability and overall balance/orientation of the transport vehicle 310 relative to the low-pressure environment transport tube 120 is maintained. The at least one plate 340 is also designed to address the elevated operational speeds and weight of the transport vehicle 310 in the low-pressure environment transport tube 120, as well as the elevated drag forces F acting on the at least one plate 340 during deceleration. Design considerations may include deployment speed, deployment force and material selection. Moreover, it is contemplated that deployment of the at least one plate 340 is controlled such that any forces experienced by human passengers and/or cargo during deployment are within a safety tolerance range that would prevent serious injury to passengers and/or damage to cargo. It is further contemplated that as the transport vehicle 310 continues to decelerate the at least one plate 340 may remain fixed in the open position or retract in a corresponding manner until a safe speed is reached or the transport vehicle 310 is stopped.

It is noted that the depiction of the at least one plate 340 is omitted in FIG. 10 for purposes of clarity and to more clearly illustrate other aspects of the transport vehicle 310 described herein.

In embodiments and as shown, for example, in FIGS. 3A, 4A and 5A, the deployable decelerator 320 includes the airbag 330 and the at least one plate 340, and both are configured to deploy from the transport vehicle 310. As shown, for example, in FIG. 3A, the airbag 330 and the at least one plate 340 are deployable from the frontal area 310*a* of the transport vehicle 310 outwardly toward (e.g., in the radial direction of) the low-pressure environment transport tube 120. When deployed simultaneously, such a multiple-option decelerator configuration decreases both the distance and the time required to decelerate the transport vehicle 310 either to a safe speed or to a complete stop within the low-pressure environment transport tube 120. Such a configuration also provides multiple deceleration options depending on the type of deceleration required. For example, if it is determined that an emergency stop is required immediately (e.g., imminent collision with an object in the low-pressure environment transport tube 120), both the airbag 330 and the at least one plate 340 may be deployed. If, however, it is determined that only a gradual slow-down is necessary, only one of the airbag 330 or the at least one plate 340 may be deployed.

Figure 6A:
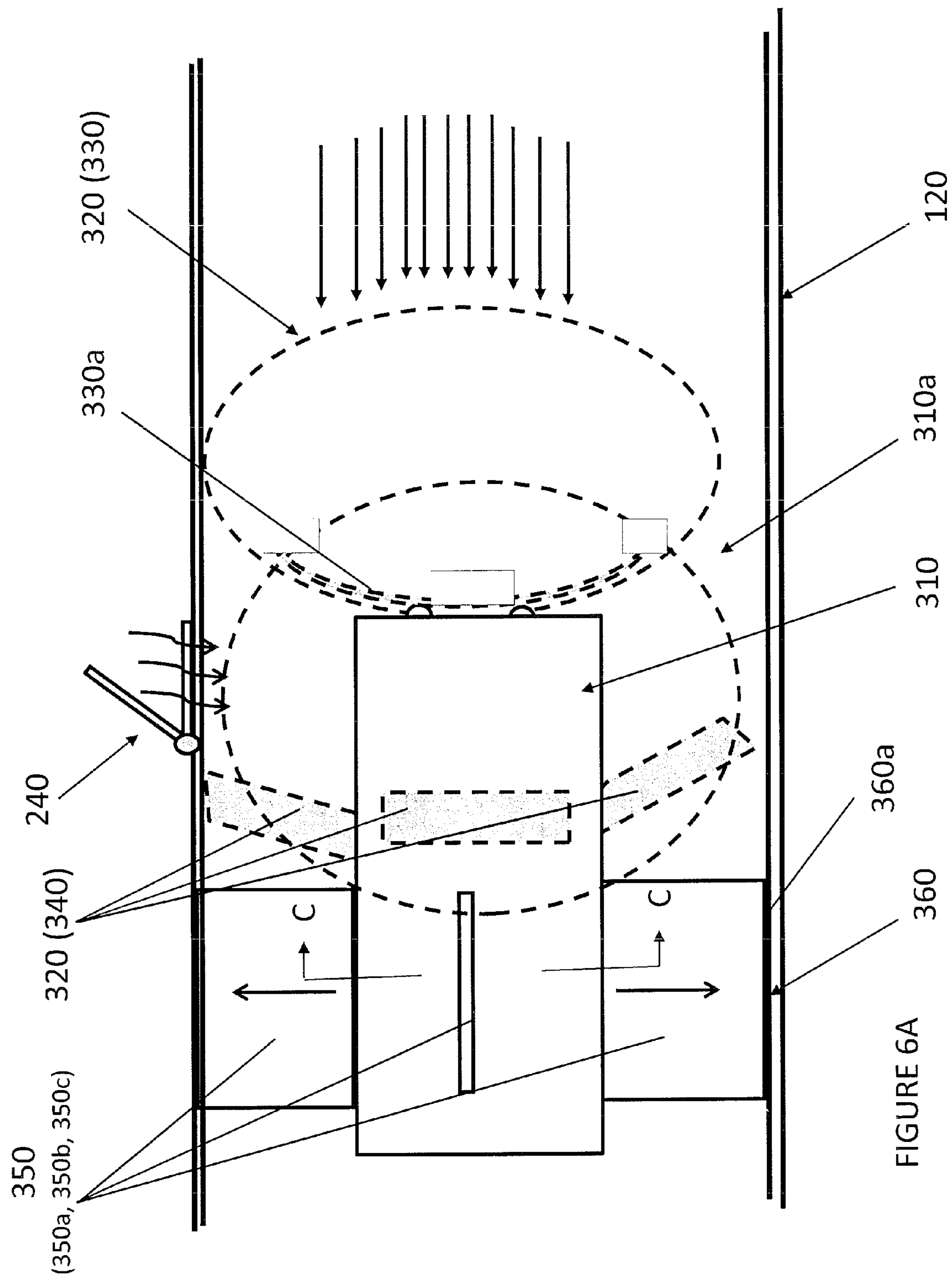
FIG. 6A shows the transport vehicle of FIG. 3A, according to a third aspect of the present disclosure.
Figure 6B:
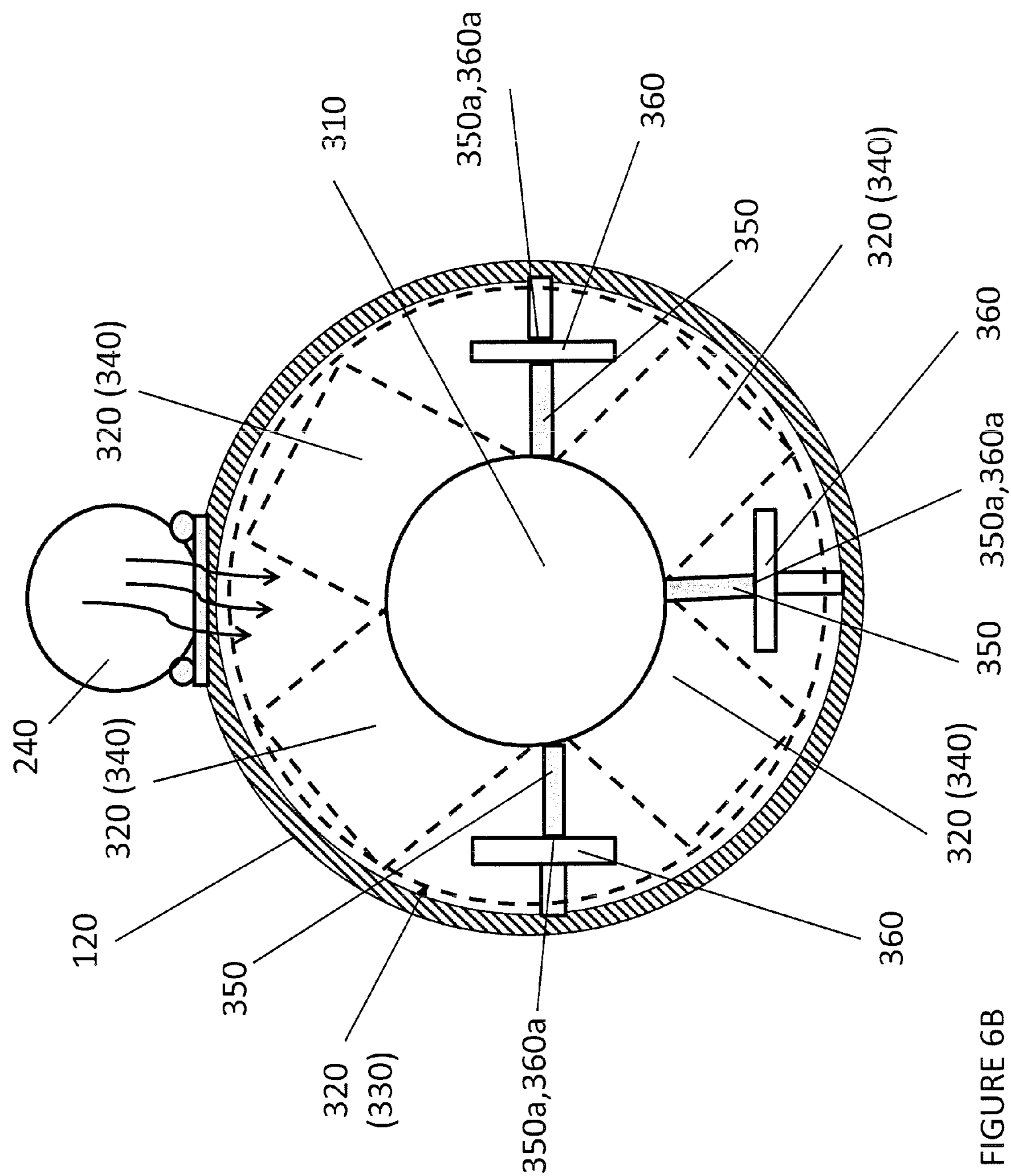
FIG. 6B shows a cross-sectional view of the transport vehicle of FIG. 6A along line C-C.

In embodiments and as shown in FIGS. 6A and 6B, in addition to or alternative to the deployable decelerators 320, one or more deployable braking pads 350 are provided on the transport vehicle 310. As shown, for example, in FIG. 6A, the braking pad 350 is configured to be deployable along an outer peripheral surface of the transport vehicle 310 and configured to couple with a fixed braking pad 360 provided on and extending along the interior of the low-pressure environment transport tube 120. In embodiments, the deployable braking pad 350 comprises a plurality of flat plates 350*a*, 350*b*, 350*c* deployable at spaced intervals along the outer peripheral surface of the transport vehicle 310 in the direction toward (e.g., the radial direction of) the low-pressure environment transport tube 120. In embodiments, the deployable braking pad 350 has a contact surface 350*a* that includes a carbon reinforced carbon material. In embodiments, the fixed braking pad 360 also has a contact surface 360*a* that is configured to contact the carbon reinforced carbon contact surface 350*a* of the deployable braking pad 350. While the contact surfaces of braking pads 350, 360 have been described with reference to a specific material, it is contemplated that the contact surfaces 350, 360 could include, in addition to or alternative to the carbon reinforced carbon material, any material that exhibits, e.g., sufficient resistance to thermal shock and thermal expansion to handle the immense forces that would be produced by attempting to safely and stably decelerate the transport vehicle 310 to a slower speed or a complete stop within the low-pressure environment.

The deployable braking pad 350 may be deployable in a manner similar to that of the above-described at least one plate 340. That is, the deployable braking pad 350 may be rotatably or slidably deployed from a closed position, in which the deployable braking pad 36 is flush or level with the outer peripheral surface of the transport vehicle 310, to a braking position, in which the deployable braking pad 350 is rotated or extended outward from the outer peripheral surface so as to project from the outer peripheral surface of the transport vehicle 310 to press against the fixed braking pad 360. Those having ordinary skill in the art would readily appreciate that the deployable braking pad 350 on the transport vehicle 310 may be alternatively fixed and the fixed braking pad 360 on the low-pressure environment transport tube 120 may be deployable. Further, each deployable braking pad 350 may be flat or have a slight curvature depending on the contour of the outer peripheral surface of the transport vehicle 110. The deployable braking pad 350 may also be rigid or have flexibility to stabilize the braking pads 350 upon impact with the fixed braking pads 360 to ensure a stable and safe deceleration of the transport vehicle 310.

In operation, when the deployable braking pad 350 is actuated, the deployable braking pad 350 is configured to press against the fixed braking pad 360 on the low-pressure environment transport tube 120 to generate frictional forces to decelerate the transport vehicle 310 in the direction of motion. The deployable braking pad 350 may also include heat transfer elements to dissipate heat generated by the frictional contact made with the fixed braking pad 360 during deceleration. Similarly, the fixed braking pad 360 may also include heat transfer elements to dissipate heat generated by the frictional contact made with the deployable braking pad 350 during deceleration. It is contemplated that the heat transfer elements may include, for example, a plurality of heat dissipating fins, holes, and/or cooling fluid channels.

The deployable braking pad 350 and the fixed braking pad 360 are also designed to address the elevated operational speeds and weight of the transport vehicle 310 in the low-pressure environment transport tube 120, as well as the elevated drag forces F acting on the transport vehicle 310 during deceleration. Design considerations may include deployment speed, deployment force and material selection. Moreover, it is contemplated that deployment of the braking pad 350 is controlled such that any forces experienced by human passengers and/or cargo during deployment are within a safety tolerance range that would prevent serious injury to passengers and/or damage to cargo.

The decelerators 320 (330, 340), as well as the braking pad 350, may be deployed manually or automatically based on information obtained during the operation of the transport vehicle 310 through the low-pressure environment tube 120. It is contemplated that a single decelerator 320 or any combination of the decelerators 330, 340 described above may be provided on the transport vehicle 310 and deployment of each decelerator 330, 340 and braking pad 350 may be independent of one another, simultaneous with one another, sequential to one another, or alternatively to one another. Moreover, when a plurality of plates 340 are provided, each plate 340 may be deployed simultaneously or deployed at different times and/or rates based on the system's deceleration requirements. Similar configuration control is contemplated for the braking pads 350 as well. In addition, it is further contemplated that each of the decelerators may also be manually controlled and operated on-board or remotely (e.g., at the terminal stations or elsewhere) for testing purposes or based on information analyzed in the transport vehicle deceleration system 200 regarding the operating conditions of the transport vehicle 310 itself (e.g., operating conditions of electrical systems, mechanical systems, communication systems, passenger/freight cabin monitoring systems, outer structural systems, alarm systems, video systems), the low-pressure environment in which the transport vehicle 310 is operating, the low-pressure environment tube 120 itself, the other transport vehicles along the route or even an emergency situation at one or more of the terminal stations 130. It is further contemplated that each transport vehicle 310 may also be equipped with an emergency brake and an associated actuator so that a passenger or authorized personnel on the transport vehicle 310 may bypass the automated deployment configuration and deploy any one or certain of the deployable decelerators and/or braking pad 350.

Figure 7:
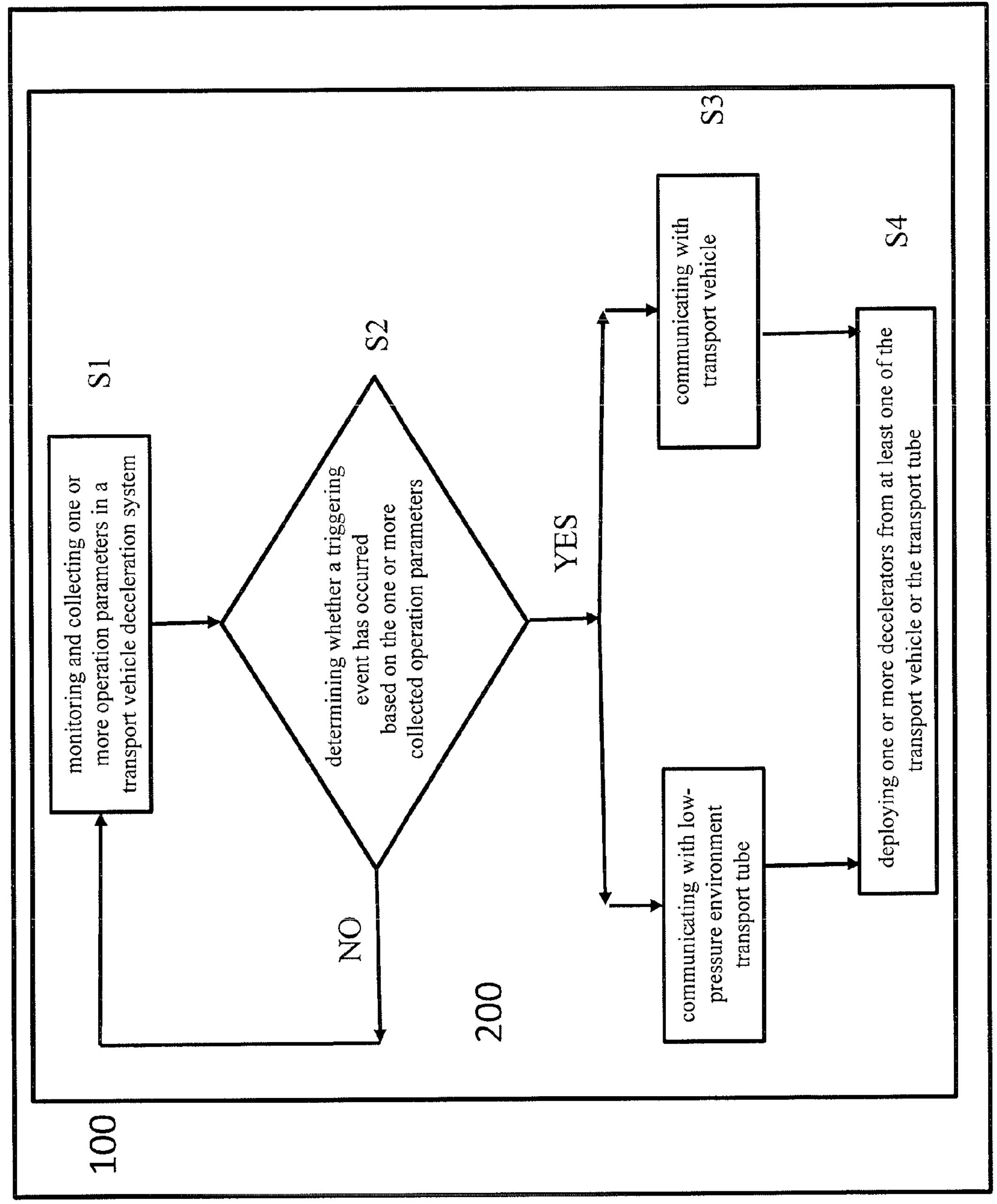
FIG. 7 shows a flowchart depicting an exemplary, non-limiting embodiment of a method of decelerating a transport vehicle in a low-pressure environment structure, according to aspects of the present disclosure.

FIG. 7 is a flowchart illustrating a method of decelerating the transport vehicle 310 in the low-pressure environment transport tube 120, according to a non-limiting embodiment of the present application. As described above, the elements of the transportation system 100, including, but not limited to, the transport vehicle 110, 310, the low-pressure environment transport tube 120 and the terminal stations 130, may be equipped with a sensors, monitors, processors and communications devices to monitor, collect and store data associated with operation parameters of the transport vehicle 110, 310, the low-pressure environment transport tube 120 and the terminal stations 130.

Figure 8:
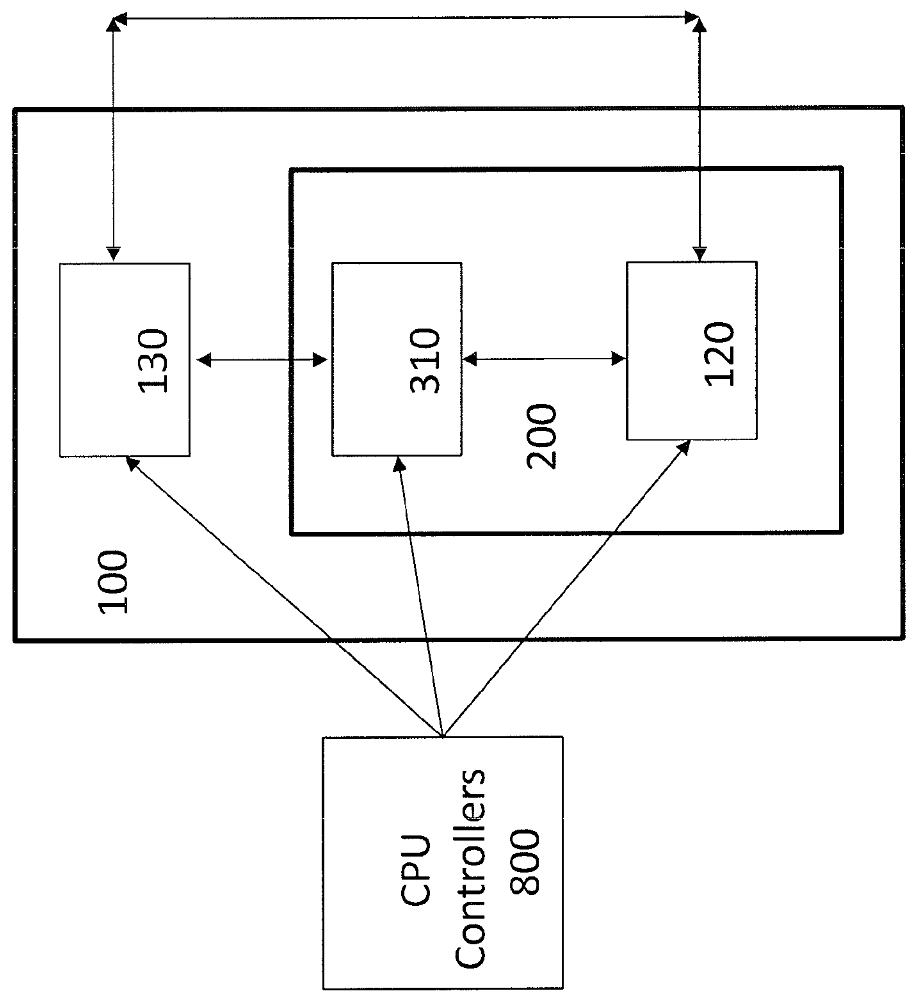
FIG. 8 shows a block diagram of an exemplary, non-limiting embodiment of a transport vehicle deceleration control system.

In addition, referring now to FIG. 8, it should be understood that appropriate controllers and processors 800 (e.g., located in computer systems implemented in the low-pressure environment tube 120, the transport vehicle 310, and the terminal stations 130) may be utilized to actuate the transport vehicle deceleration system 200 based on the analysis of information received from the sensors, monitors processors and communication devices 220. When the controllers and processors 800 receive and identify a triggering event related to the operation information and data collected by the sensors, monitors, processors and the communications devices 220 (or manual instructions received on-board or remotely during, e.g., a testing operation of the deceleration system), the controllers 800 instruct (e.g., transmit a signal to) the appropriate sub-systems/components/controllers of the transport vehicle deceleration system 200 (e.g, ambient-air port 240, decelerators 320, braking pads 350) to initiate deceleration of the transport vehicle 310, e.g., to deploy the decelerators 330, 340 or braking pads 350 of the transport vehicle 310 and/or to open the ambient-air port 240 of the low-pressure environment tube 120 or to deploy braking pad 360. As a result, the transport vehicle 310 can be decelerated in a safe and stable manner.

In embodiments, the triggering events may be based on deviations outside of a predetermined range of known data associated with a single or multiple operation parameters, for example, an unsafe change in speed along the route, a change in object proximity, a change in tube environment, a passenger distress alert, a change in temperature, an onboard electrical or mechanical system malfunction, or an emergency at a terminal station.

In operation, the method includes monitoring a plurality of operation parameters collected by the plurality of sensors, monitors, processors and various communication systems 220 on any one of the transport vehicle 310, the low-pressure environment transport tube 120 and the terminal stations 130 (S1). The controllers and processors of the transport vehicle 310, the low-pressure environment transport tube 120 and the terminal stations 130 are configured to compare the collected operation parameters to the predetermined threshold values or ranges of the operation parameters. When one or more of the collected operation parameters is identified as failing to meet or falling outside of the predetermined threshold values or ranges, one or more of the controllers identify this deviation as the triggering event and instruct the transport vehicle deceleration system 200 to decelerate the transport vehicle 310 (S2).

When the transport vehicle deceleration system 200 receives instructions to decelerate the transport vehicle 310, one or more of the decelerators 330, 340 and the braking pads 350 may be deployed (S3, S4). In embodiments, one or more of the decelerator 330, 340 may deploy (as described in detail above) to decrease a distance between the transport vehicle 310 and the low-pressure environment transport tube 120. In other embodiments, the decelerators 330, 340 may deploy (as also described in detail above) such that a frontal area of the transport vehicle 310 is increased and substantially fills an entire inner cross sectional area of the low-pressure environment transport tube 120.

In further embodiments, when the transport vehicle deceleration system 200 receives instructions to decelerate the transport vehicle 310, one or more of the braking pads 350 may deploy (as also described in detail above) along the outer peripheral surface of the transport vehicle 310 and contact the fixed braking pads 360 provided on and extending along the low-pressure environment transport tube 120. When the braking pads 350 are deployed, the braking pads 350 are pressed against the fixed braking pads 360 on the low-pressure environment transport tube 120 to generate frictional forces to decelerate the transport vehicle 310.

In still other embodiments, the method includes opening the closable ambient-air port 240 provided on the low-pressure environment transport tube 120 to draw in ambient air into the low-pressure environment transport tube 120. Drawing in the ambient are also increases drag forces acting on the transport vehicle 310 and thus further assists in decelerating the transport vehicle 310.

For example, as the transport vehicle 310 is traveling through the low-pressure environment transport tube 120, an on-board proximity detector 220 may detect an object in its path. An onboard controller 800 (of the transport vehicle 310) connected to the proximity detector 220 may analyze the detected distance between the transport vehicle 310 and the object to determine whether or not the detected distance is within a predetermined safe distance range or falls outside of the predetermined safe range. If, the detected distance falls outside of the safe range, the controller 800 may, simultaneously or subsequently, analyze other incoming data from other connected sensors, monitors and communication devices 220. For example, after detecting that the distance falls outside the predetermined safe range, the controller 800 may receive information from another transport vehicle communicating operating conditions downstream of the transport vehicle 310. The communication from the downstream transport vehicle may indicate that the downstream transport vehicle has slowed down due to detected seismic activity.

As a result, the controller 800 may correlate and analyze the combination of operation parameters and determine that a triggering event has occurred. Once the triggering event has occurred, the controller 800 will communicate with the transport vehicle deceleration system 200 and instruct controllers of one or more of the deployable decelerators 330, 340, the braking pads 350, 360 and the ambient-air port 240 to deploy to assist in decelerating the transport vehicle 310. It is contemplated that if the triggering event is identified as an emergency event, the controller may instruct multiple deployable decelerators 330, 340 and the braking pad 350 to deploy for an immediate stop of the transport vehicle 310. However, if the triggering event is identified as only a caution event, the controller may instead only instruct the deployable decelerator 340 to gradually deploy for a gradual slow down until the triggering event is no longer detected. It is noted that controller 800 of any one of the components in the transport vehicle deceleration system 200 may be one or more controllers used to analyze information and data and communicate instructions to the other components of the transport vehicle deceleration system 200.

Accordingly, the above-described deployable decelerators, systems and related methods enable a transport vehicle within a low-pressure environment transport tube to decelerate to a slower speed or stop in a stable and safe manner.

Although the above-described deployable decelerators, systems and related methods have been described with reference to several exemplary embodiments, it is understood that the words that have been used are words of description and illustration, rather than words of limitation. Changes may be made within the purview of the appended claims, as presently stated and as amended, without departing from the scope and spirit of the above-described deployable decelerators, systems and related methods in its various aspects. Although the above-described deployable decelerators, systems and related methods have been described with reference to particular means, materials and embodiments, the above-described deployable decelerators, systems and related methods are not intended to be limited to the particulars disclosed; rather the above-described deployable decelerators, systems and related methods extend to all functionally equivalent structures, methods, and uses such as are within the scope of the appended claims.

Although the present specification may describe components and functions that may be implemented in particular embodiments with reference to particular standards and protocols, the disclosure is not limited to such standards and protocols. For example, components of the non-limiting embodiments of the various the plurality of sensors, monitors, processors and communication systems 220 represent examples of the state of the art. Such standards are periodically superseded by equivalents having essentially the same functions. Accordingly, replacement standards and protocols having the same or similar functions are considered equivalents thereof.

The illustrations of the embodiments described herein are intended to provide a general understanding of the structure of the various embodiments. The illustrations are not intended to serve as a complete description of all of the elements and features of the disclosure described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The preceding description of the disclosed embodiments is provided to enable any person skilled in the art to make or use the present disclosure. As such, the above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A transport vehicle for traveling in a low-pressure environment structure, comprising:

a deployable decelerator provided on the transport vehicle and configured to deploy from the transport vehicle to decrease a distance between the transport vehicle and the low-pressure environment structure, wherein the deployable decelerator comprises an airbag that is configured to deploy from a frontal area of the transport vehicle outward in a direction toward the low-pressure environment structure, and when the decelerator is deployed the decelerator is configured to increase drag forces opposing a direction of motion of the transport vehicle and decelerate the transport vehicle.

2. The transport vehicle for traveling in the low-pressure environment structure of claim 1, wherein the deployable decelerator further comprises a brace configured to support the outward deployment of the airbag as the drag forces acting on the transport vehicle increase during deceleration.

3. The transport vehicle for traveling in the low-pressure environment structure of claim 1, wherein the deployable decelerator is configured to deploy such that the frontal area of the transport vehicle is increased and substantially fills an entire inner cross sectional area of the low-pressure environment structure.

4. The transport vehicle for traveling in the low-pressure environment structure of claim 1, wherein the airbag is configured to deploy outward in a direction toward the low-pressure environment structure such that an outer periphery of the deployed airbag is closer to an inner surface of the low-pressure environment structure than an outer periphery of the transport vehicle.

5. The transport vehicle for traveling in the low-pressure environment structure of claim 1, wherein the airbag is configured to deploy such that the airbag entirely surrounds the transport vehicle in a cross sectional view of the low-pressure environment structure.

6. A transport vehicle for traveling in a low-pressure environment structure, comprising:

a deployable decelerator provided on the transport vehicle and configured to deploy from the transport vehicle to decrease a distance between the transport vehicle and the low-pressure environment structure, wherein the deployable decelerator comprises at least one plate that is configured to rotatably deploy from a frontal area of the transport vehicle outward in a direction toward the low-pressure environment structure, and when the decelerator is deployed the decelerator is configured to increase drag forces opposing a direction of motion of the transport vehicle and decelerate the transport vehicle.

7. The transport vehicle for traveling in the low-pressure environment structure of claim 6, wherein the deployable decelerator is configured to deploy such that the frontal area of the transport vehicle is increased and substantially fills an entire inner cross sectional area of the low-pressure environment structure.

8. The transport vehicle for traveling in the low-pressure environment structure of claim 6, wherein the at least one plate is configured to deploy outward in a direction toward the low-pressure environment structure such that an outer periphery of the deployed at least one plate is closer to an inner surface of the low-pressure environment structure than an outer periphery of the transport vehicle.

9. A transport vehicle for traveling in a low-pressure environment structure, comprising:

a deployable decelerator provided on the transport vehicle and configured to deploy from the transport vehicle to decrease a distance between the transport vehicle and the low-pressure environment structure, wherein the deployable decelerator comprises an airbag and at least one plate that are configured to both deploy from the transport vehicle outward in a direction toward the low-pressure environment structure, and when the decelerator is deployed the decelerator is configured to increase drag forces opposing a direction of motion of the transport vehicle and decelerate the transport vehicle.

10. The transport vehicle for traveling in the low-pressure environment structure of claim 9, wherein at least one of the airbag and the at least one plate is configured to deploy outward in a direction toward the low-pressure environment structure such that an outer periphery of the at least one deployed airbag or the deployed at least one plate is closer to an inner surface of the low-pressure environment structure than an outer periphery of the transport vehicle.

11. A transport vehicle for traveling in a low-pressure environment structure, comprising:

a deployable decelerator provided on the transport vehicle and configured to deploy from the transport vehicle to decrease a distance between the transport vehicle and the low-pressure environment structure, wherein the deployable decelerator comprises a deployable braking pad that is configured to deploy along an outer peripheral surface of the transport vehicle and configured to couple with a fixed braking pad provided on and extending along the low-pressure environment structure, the deployable braking pad comprises a carbon reinforced carbon material contact surface that is configured to contact a corresponding contact surface of the fixed braking pad on the low-pressure environment structure, when the decelerator is deployed the decelerator is configured to increase drag forces opposing a direction of motion of the transport vehicle and decelerate the transport vehicle, and when the deployable braking pad is actuated, the carbon reinforced carbon material contact surface is pressed against the corresponding contact surface of the fixed braking pad on the low-pressure environment structure to generate frictional forces to decelerate the transport vehicle.

12. The transport vehicle for traveling in the low-pressure environment structure of claim 11, wherein the deployable braking pad comprises a plurality of braking pads deployable at spaced intervals along the outer peripheral surface of the transport vehicle in a direction toward the low-pressure environment structure.

13. A method of decelerating a transport vehicle in a low-pressure environment structure, comprising:

monitoring at least one operation parameter collected by at least one sensor in a transportation system;

analyzing, via a controller communicating with the at least one sensor, the at least one collected operation parameter;

detecting, via the controller, a triggering event based on the at least one collected operation parameter;

transmitting, via a signal from the controller, instructions to a transport vehicle deceleration system to decelerate the transport vehicle; and deploying a decelerator from the transport vehicle deceleration system to decelerate the transport vehicle in the low-pressure environment structure when the triggering event is detected.

14. The method of decelerating the transport vehicle in the low-pressure environment structure of claim 13, wherein in the deploying of the decelerator, a distance between the transport vehicle and the low-pressure environment structure is decreased, and the deployed decelerator deploys such that a frontal area of the transport vehicle is increased and substantially fills an entire inner cross sectional area of the low-pressure environment structure.

15. The method of decelerating the transport vehicle in the low-pressure environment structure of claim 13, wherein the deployable decelerator comprises an airbag that deploys from the transport vehicle outwardly in a direction toward the low-pressure environment structure.

16. The method of decelerating the transport vehicle in the low-pressure environment structure of claim 13, wherein the deployable decelerator comprises at least one plate that deploys from the transport vehicle outwardly in a direction toward the low-pressure environment structure.

17. The method of decelerating the transport vehicle in the low-pressure environment structure of claim 13, wherein the deployable decelerator comprises an airbag and at least one plate that both deploy from the transport vehicle outwardly in a direction toward the low-pressure environment structure.

18. The method of decelerating the transport vehicle in the low-pressure environment structure of claim 13, wherein the deployable decelerator comprises a deployable braking pad that deploys along an outer peripheral surface of the transport vehicle and contacting a fixed braking pad provided on and extending along the low-pressure environment structure, wherein when the braking pad is deployed, the braking pad presses against the fixed braking pad on the low-pressure environment structure and generates frictional forces to decelerate the transport vehicle.

19. The method of decelerating the transport vehicle in the low-pressure environment structure of claim 18, wherein the braking pad comprises a plurality of braking pads that deploy at spaced intervals along the outer peripheral surface of the transport vehicle outwardly in a direction toward the low-pressure environment structure.

20. The method of decelerating the transport vehicle in the low-pressure environment structure of claim 13, wherein the deployable decelerator comprises a closable ambient-air port provided on the low-pressure environment structure that opens and draws in ambient air into the low-pressure environment structure to increase drag forces acting on the transport vehicle and decelerate the transport vehicle.

21. A transport vehicle deceleration system for decelerating a transport vehicle in a low-pressure environment structure, comprising:

a deployable decelerator configured to deploy from the transport vehicle to decrease a distance between the transport vehicle and the low-pressure environment structure; and a closable ambient-air port provided on a low-pressure environment structure and configured to draw ambient air into the low-pressure environment structure, wherein when at least one of the deployable decelerator and the ambient-air port are deployed drag forces acting on the transport vehicle are increased to decelerate the transport vehicle.

22. The transport vehicle deceleration system for decelerating the transport vehicle in the low-pressure environment structure of claim 21, wherein the deployable decelerator comprises at least one of an airbag and at least one plate deployable from the transport vehicle outward in a direction toward the low-pressure environment structure.

23. The transport vehicle deceleration system for decelerating the transport vehicle in the low-pressure environment structure of claim 21, further comprising:

a deployable braking pad that is deployable along an outer peripheral surface of the transport vehicle and configured to couple with a fixed braking pad provided on and extending along the low-pressure environment structure, and when the deployable braking pad is actuated, the deployable braking pad is configured to press against the fixed braking pad on the low-pressure environment structure to generate frictional forces to decelerate the transport vehicle.

* * * * *